(12) United States Patent
Kinder et al.

(10) Patent No.: US 12,561,418 B1
(45) Date of Patent: Feb. 24, 2026

(54) SYSTEMS AND METHODS FOR AUTHENTICATION TO RESOURCE SERVERS

(71) Applicant: Nametag, Inc., Seattle, WA (US)

(72) Inventors: Ross Kinder, Ann Arbor, MI (US);
Jonathan Bauer, Emeryville, CA (US);
Andrew Catellier, Denver, CO (US);
Ben Fenwick, Papillion, NE (US)

(73) Assignee: Nametag, Inc., Seattle, WA (US)

( * ) Notice: Subject to any disclaimer, the term of this patent is extended or adjusted under 35 U.S.C. 154(b) by 0 days.

(21) Appl. No.: 18/976,263

(22) Filed: Dec. 10, 2024

(51) Int. Cl.
*G06F 21/00* (2013.01)
*G06F 21/32* (2013.01)

(52) U.S. Cl.
CPC ..................................... *G06F 21/32* (2013.01)

(58) Field of Classification Search
CPC ....................................................... G06F 21/32
See application file for complete search history.

(56) References Cited

U.S. PATENT DOCUMENTS

| | | | |
|---|---|---|---|
| 2004/0010697 A1* | 1/2004 | White | G06F 21/31 713/186 |
| 2011/0126280 A1* | 5/2011 | Asano | G06F 21/32 726/19 |
| 2014/0354401 A1* | 12/2014 | Soni | G06F 21/32 340/5.52 |
| 2017/0134366 A1* | 5/2017 | Genner | G06Q 40/03 |
| 2024/0121276 A1* | 4/2024 | Levering | H04L 63/08 |

* cited by examiner

Primary Examiner — William A Corum, Jr.
(74) *Attorney, Agent, or Firm* — Foley & Lardner LLP

(57) ABSTRACT

Systems and methods for linking an authentication account to a device may include processor(s) to maintain a plurality of authentication profiles, each authentication profile corresponding to a respective user and including at least one profile image, an immutable identifier, and authentication data used to authenticate the respective user. The processor(s) may receive a request including the device key, an immutable identifier, and a biometric image captured by a camera of a client device. The processor(s) may identify a subset of authentication profiles having respective immutable identifiers that match the immutable identifier from the request. The processor(s) may compare feature(s) extracted from the biometric image of the request to features extracted from the a profile image of the subset of authentication profiles, and link the device key of the client device with an authentication profile in a data structure to register the client device with the authentication server.

20 Claims, 14 Drawing Sheets

| ☒ | All Directories | |
| --- | --- | --- |
| ☒ | RS1 | Product Directory |
| ☒ | RS2 | CS Directory |
| ☒ | RS3 | Engineering Directory |

FIG. 9A

CSV Uploaded!

Directories                    Product Directory  ⌄

| CSV Headers | Name_legal ⌄ | OptField003 ⌄ | img20321 ⌄ |
| --- | --- | --- | --- |
| | ⇩ | ⇩ | ⇩ |
| Auth. Serv. Headers | Legal Name ⌄ | Birthdate ⌄ | Profile photo ⌄ |

FIG. 9B

Figure 10:
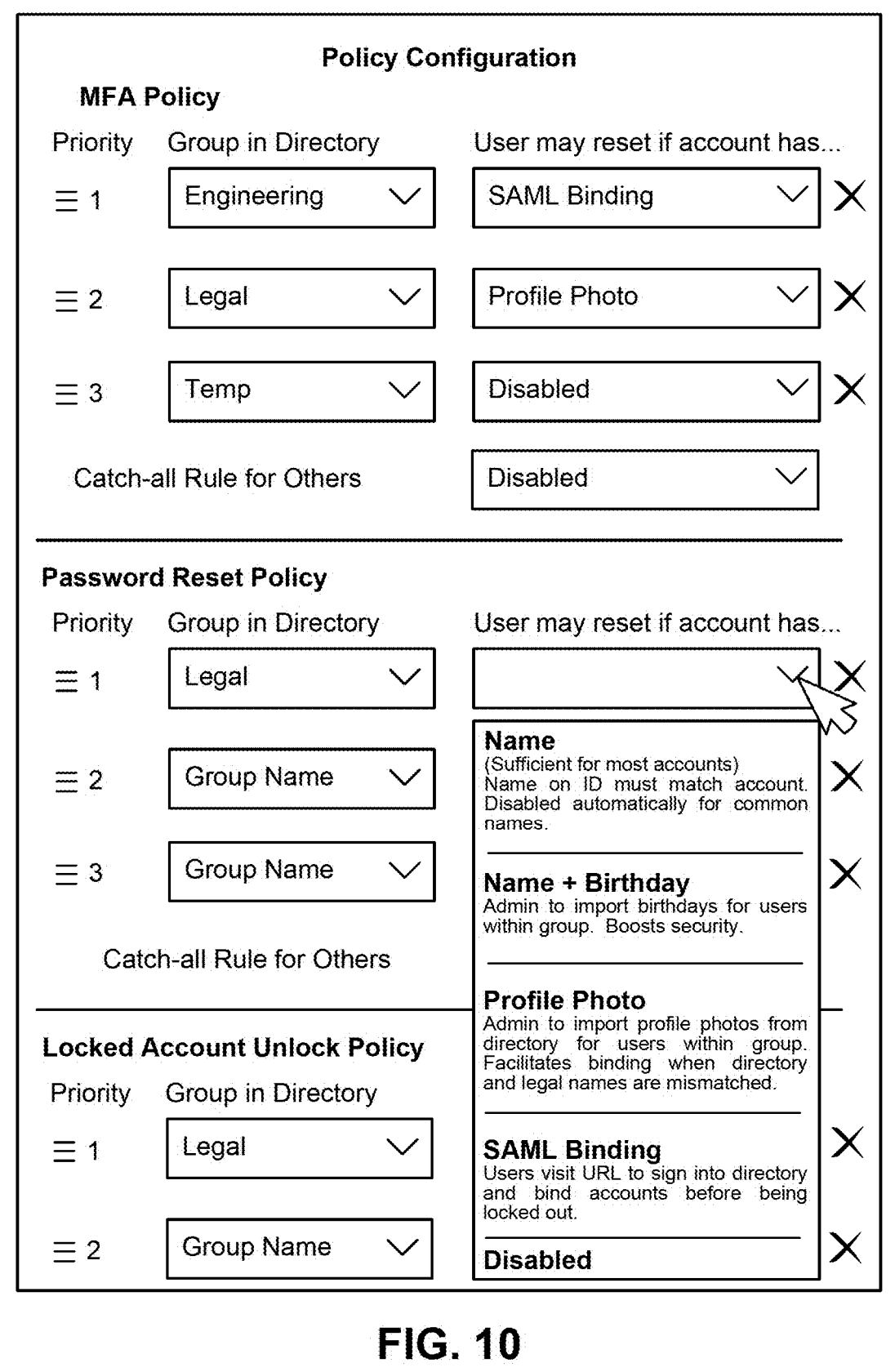

Policy Configuration

MFA Policy

| Priority | Group in Directory | User may reset if account has... |
|----------|--------------------|----------------------------------|
| ☰ 1 | Engineering ⌄ | SAML Binding ⌄ ✕ |
| ☰ 2 | Legal ⌄ | Profile Photo ⌄ ✕ |
| ☰ 3 | Temp ⌄ | Disabled ⌄ ✕ |
| Catch-all Rule for Others | | Disabled ⌄ |

Password Reset Policy

| Priority | Group in Directory | User may reset if account has... |
|----------|--------------------|----------------------------------|
| ☰ 1 | Legal ⌄ | ⌄ ✕ |
| ☰ 2 | Group Name ⌄ | ✕ |
| ☰ 3 | Group Name ⌄ | ✕ |
| Catch-all Rule for Others | | |

Name
(Sufficient for most accounts)
Name on ID must match account. Disabled automatically for common names.

Name + Birthday
Admin to import birthdays for users within group. Boosts security.

Profile Photo
Admin to import profile photos from directory for users within group. Facilitates binding when directory and legal names are mismatched.

SAML Binding
Users visit URL to sign into directory and bind accounts before being locked out.

Disabled

Locked Account Unlock Policy

| Priority | Group in Directory |
|----------|--------------------|
| ☰ 1 | Legal ⌄ |
| ☰ 2 | Group Name ⌄ |

SYSTEMS AND METHODS FOR AUTHENTICATION TO RESOURCE SERVERS

INTRODUCTION

This application is generally directed to authentication, including systems and methods for authentication to third-party resource servers.

Users may access various resources on a client or client device. Some resources may be protected such that, for a user to obtain access to the resource, the user may be authenticated. Where a user loses access or permissions to access a resource (e.g., due to lost password or log-in credentials, first time accessing on a new client device, and forth), the user may need to reauthenticate for regaining access to the resource. This process can be cumbersome and prone to various social engineering attacks, which increases delay in authorized access to resources and increases exposure for unauthorized access to resources.

SUMMARY

At least one aspect of the present disclosure is directed to a method. The method includes receiving, by an authentication server, a request to authenticate a user to a third-party resource hosted on a second server; receiving, by the authentication server from a client device of a user, via a session between the authentication server and an authentication service executing on the client device, an image of an identification document (ID) including user identity information for the user. The method includes receiving, by the authentication server, from the second server, stored information relating to the user, where the stored information corresponds to the user identity information. The method includes computing, by the authentication server, a match score of at least a portion of the stored information from the second server and at least a portion of the user identity information. The method includes transmitting, by the authentication server, a signal to the second server, the signal indicating an authentication status of the user for accessing the third-party resource, according to the match score.

In some embodiments, the method further includes, responsive to the match score satisfying a threshold criterion, setting a flag status indicating a binding of an authentication profile of the user with the authentication service to the third-party resource. In some embodiments, the request includes a first request. The method may include receiving, by the authentication server, a second request to authenticate the user to the third-party resource hosted on the second server. The method may include determining, by the authentication server, the flag status in the authentication profile. The method may include receiving, by the authentication server, a biometric image of the user from the authentication service executing on the client device. The method may include transmitting, by the authentication server, a second signal to the second server indicating successful authentication of the user, responsive to a comparison of the biometric image of the user satisfying a match criteria with respect to an image stored in association with the authentication profile of the user.

In some embodiments, the method further includes applying, by the authentication server, a first portion of the user identity information to a model, to determine a uniqueness score associated with the first portion of the user identity information; comparing, by the authentication server, the uniqueness score to a threshold; and selecting, by the authentication server, a type of the stored information from the second server based on the uniqueness score as compared to the threshold. In some embodiments, the user identity information includes a photograph of the user. The method may further include receiving, by the authentication server, from the authentication service, a biometric image of the user captured via one or more cameras of the client device during the session; and comparing, by the authentication server, one or more features extracted from the photograph of the user to one or more features extracted from the biometric image.

In some embodiments, the authentication server transmits the signal to indicate the authentication status based on the comparison and according to the match score. In some embodiments, the portion of information retrieved from the second server includes a profile image associated with the third-party resource, and the authentication server transmits the signal to indicate the authentication status, responsive to 1) the biometric image and the photograph satisfying a first match criteria, and 2) the profile image and at least one of the biometric image or the photograph satisfying a second match criteria. In some embodiments, the portion of the user identity information includes a legal name, and the portion of the stored information includes a preferred name, and the match score indicates a probability of a match between the legal name and the preferred name. In some embodiments, the portion of the user identity information further includes a date of birth as indicated in the identification document, and the portion of the stored information further includes a date of birth stored in the second server, and the match score indicates the probability of a match between a person with the legal name having the date of birth as indicated in the identification document, and a person with the preferred name having the date of birth stored in the second server.

In some embodiments, the stored information further includes a user designation with respect to the third-party resource. The method may further include selecting, by the authentication server, a type of the stored information from the second server based on the user designation, for comparison with the portion of user identify information from the identification document. In some embodiments, the third-party resource includes a first third-party resource, the stored information includes a first user designation for the first third-party resource and a second user designation for a second third-party resource, and the authentication server selects different types of the stored information from the second server based on the user designation and the corresponding third-party resource. In some embodiments, the authentication status indicates successful binding of an authentication profile of the user with the authentication service to the third-party resource, based on the match score satisfying a match criterion.

In another aspect, this disclosure is directed to an authentication system including one or more authentication servers configured to receive a request to authenticate a user to a third-party resource hosted on a second server. The one or more authentication servers may be configured to receive, from a client device of a user, via a session between the authentication server and an authentication service executing on the client device, an image of an identification document (ID) including user identity information for the user. The one or more authentication servers may be configured to receive, from the second server, stored information relating to the user, where the stored information corresponds to the user identity information. The one or more authentication servers may be configured to compute a match score of at least a portion of the stored information from the second server and at least a portion of the user identity information. The one or more authentication servers may be configured to transmit a signal to the second server, the signal indicating an authentication status of the user for accessing the third-party resource, according to the match score.

In some embodiments, the one or more authentication servers are further configured to set, responsive to the match score satisfying a threshold criterion, a flag status indicating a binding of an authentication profile of the user with the authentication service to the third-party resource. In some embodiments, the one or more authentication servers are further configured to: apply a first portion of the user identity information to a model, to determine a uniqueness score associated with the first portion of the user identity information; compare the uniqueness score to a threshold; and select a type of the stored information from the second server based on the uniqueness score as compared to the threshold. In some embodiments, the user identity information includes a photograph of the user. The one or more authentication servers may be configured to: receive, from the authentication service, a biometric image of the user captured via one or more cameras of the client device during the session; and compare one or more features extracted from the photograph of the user to one or more features extracted from the biometric image, where the one or more authentication servers transmit the signal to indicate the authentication status based on the comparison and according to the match score.

In some embodiments, the portion of information from the second server includes a profile image associated with the third-party resource, and the one or more authentication servers transmit the signal to indicate the authentication status, responsive to 1) the biometric image and the photograph satisfying a first match criteria, and 2) the profile image and at least one of the biometric image or the photograph satisfying a second match criteria. In some embodiments, the stored information further includes a user designation with respect to the third-party resource, and the one or more authentication servers are further configured to: select a type of the stored information from the second server based on the user designation, for comparison with the portion of user identify information from the identification document. In some embodiments, the third-party resource includes a first third-party resource, the stored information includes a first user designation for the first third-party resource and a second user designation for a second third-party resource, and the one or more authentication servers select different types of the stored information from the second server based on the user designation and the corresponding third-party resource. In some embodiments, the authentication status indicates successful binding of an authentication profile of the user with the authentication service to the third-party resource, based on the match score satisfying a match criterion.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 9A and FIG. 9B are views of user interfaces for initiating a file import of stored user identity information, according to an example implementation of the present disclosure.

FIG. 10 is a view of a user interface for configuring one or more policies for applying to users of the resource server, according to an example implementation of the present disclosure.

DETAILED DESCRIPTION

Following below are more detailed descriptions of various concepts related to, and implementations of, methods, apparatuses, and systems of FIGURES. The various concepts introduced above and discussed in greater detail below may be implemented in any of numerous ways.

For purposes of reading the description of the various embodiments below, the following descriptions of the sections of the specification and their respective contents may be helpful:

Section 1. Systems and Methods for Account Authentication.

Section 2. Systems and Methods for Account Recovery.

Section 3. Systems and Methods for User Verification.

Section 4. Machine Learning and Artificial Intelligence Systems.

Section 5. Computer Architecture.

1. Systems and Methods for Account Authentication

Figure 1:
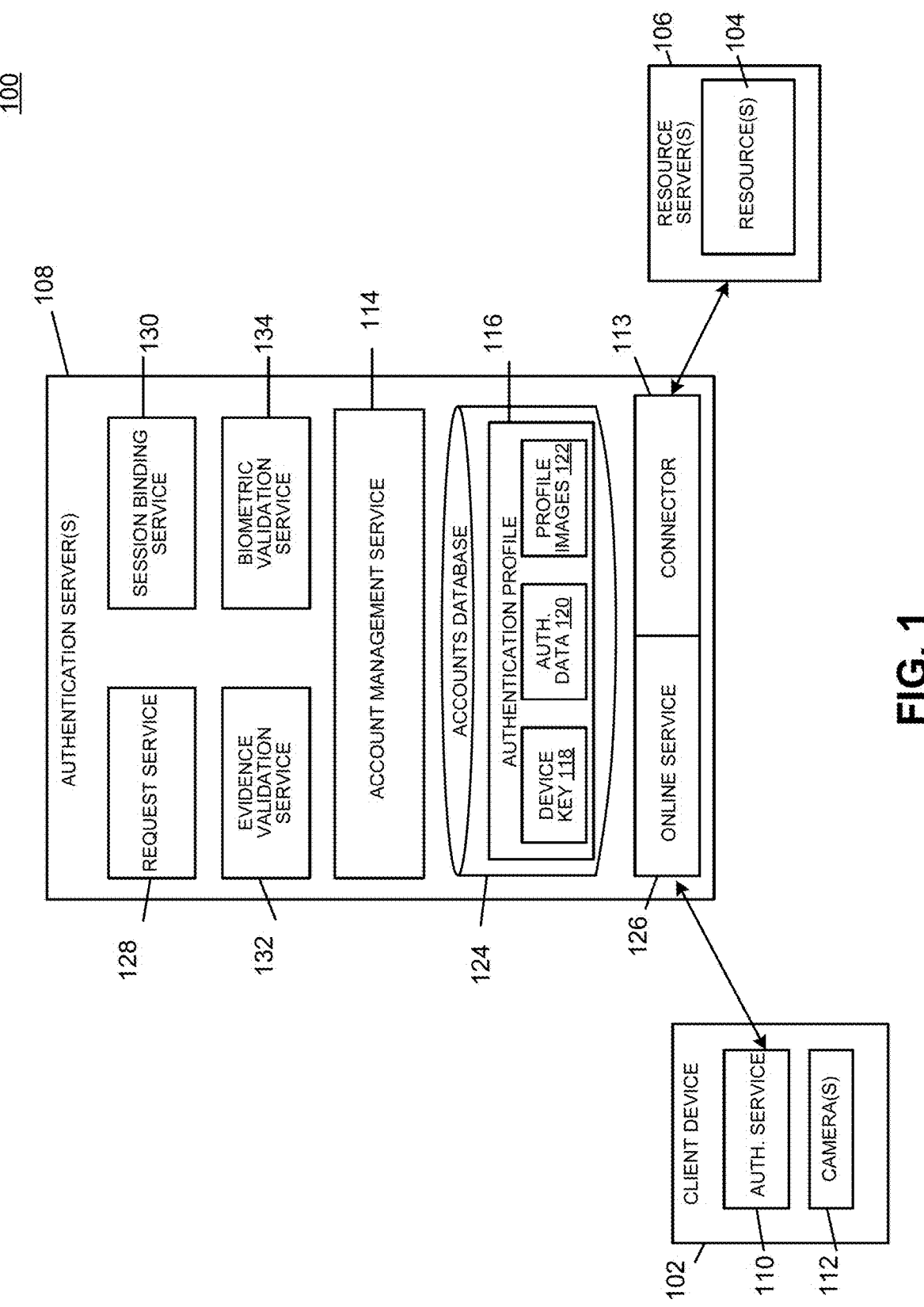
FIG. 1 is a block diagram of a system for authentication, according to an example implementation of the present disclosure.

Referring to FIG. 1, depicted is a block diagram of a system 100, which can be used for authentication. In general, a user operating a client device 102 may attempt to access a resource 104 hosted on a resource server 106. As part of resource access rights, the resource server 106 may request the user authenticate with the resource 104 prior to the user being permitted access to the resource 104. In various implementations, users may authenticate with a resource 104 through various authentication mechanisms, such as a username and password, a one-time pass code, through voice, text message, email authentication, dual-factor or multi-factor authentication, or any other authentication method or combination of authentication methods. However, some of such authentication mechanisms may be cumbersome on users, may have security risks associated therewith, and may not provide a level of authenticity that is satisfactory for access rights to a given resource. Additionally, because identities and personally identifiable information (PII) of a user can change over time (e.g., through name change, email address changes, aging or face augmentation, and so forth), such systems may not have persistence.

According to the embodiments described herein, the system 100 may include one or more authentication server(s) 108, which operate with an authentication service 110 executing on the client device 102. Together, the authentication server(s) 108 and/or authentication service 110 may be configured to share validated authentication information and identity assurance about user(s) of the client device 102 with the resource server(s) 106 upon receipt of the user's consent. In particular, and as described in greater detail below in Section 1(A), the authentication service 110 may be configured to receive, capture, or otherwise obtain authentication information or data used to authenticate users of the client device 102 (e.g., via the camera(s) 112 of the client device 102). As described in greater detail below in Section 1(C), the authentication server(s) 108 may be configured to validate or verify the authentication data provided by the authentication service 110.

The authentication server(s) 108 may include one or more connectors 113 and/or embeddable components or authentication protocol implementations configured to connect the authentication server(s) 108 to the resource server(s) 106. To provide an account recovery service, the authentication service 110 may be configured to determine information requested by the resource server(s) 106 (e.g., by the resource 104) from the user for account recovery (e.g., information available via the resource server(s) 106 for comparison against information received from the user). The authentication service 110 may be configured to collect, obtain, or otherwise receive the data packets or requests including authentication data (also referred to as evidence) from the user, and provide the received evidence to the authentication server 108. As described in Section 1(C), the authentication server 108 may be configured to validate the authentication data received from the user via the authentication service 110. The authentication server(s) 108 may be configured to retrieve corresponding information from the resource server(s) 106, compute a match score of the information from the resource server(s) and the authentication data. The authentication server(s) 108 may be configured to transmit, send, or otherwise provide a signal indicating an authentication status of the user based on the match score.

A. Initiating A Request

Figure 2:
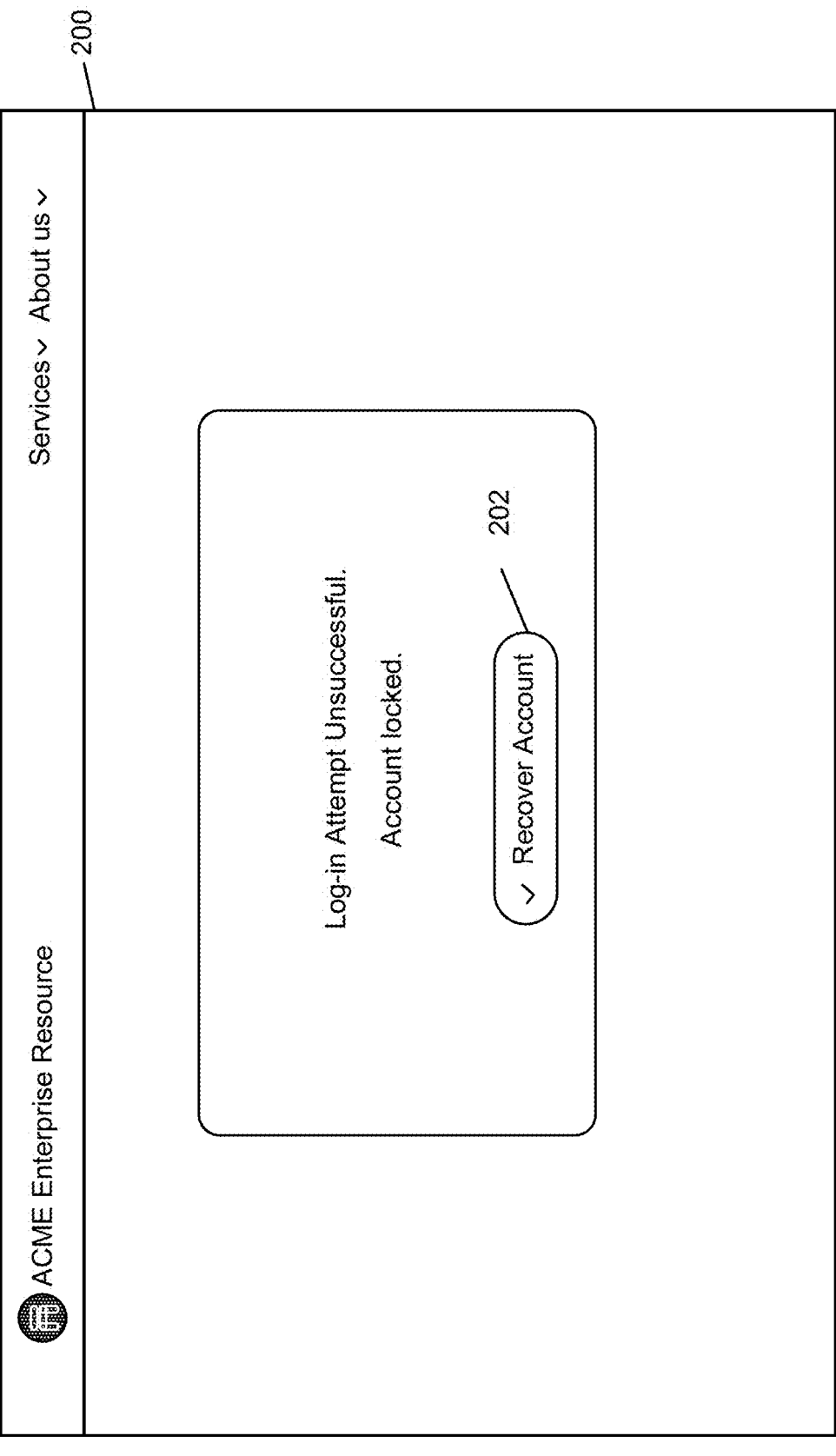
FIG. 2 is a view of a user interface of a resource hosted on a resource server, according to an example implementation of the present disclosure.

Referring now to FIG. 1 and FIG. 2, a user of the client device 102 may navigate to a webpage corresponding to a resource 104 hosted on the resource server 106. Specifically, FIG. 2 shows a user interface 200 of a resource, according to an example implementation of the present disclosure. The resource 104 may be or include any resource 104, including but not limited to websites, webpages, applications, or any other internet-based resource. The resource 104 may be a protected resource such that, to obtain access to one or more functionalities, features, or pages of the resource 104, the resource 104 may request that the user provide authentication information to authenticate to the resource 104. For example, the resource 104 may be or include an enterprise resource (e.g., corresponding to an enterprise software suite or combination of enterprise resources). In the example of FIG. 2, the user may have attempted several unsuccessful log-in attempts which caused their account with the resource 104 to be locked. As such, to re-establish trust with the resource 104 and recover the end-user's account with the resource 104, the user may select a user interface element 202 to perform account recovery.

Figure 3:
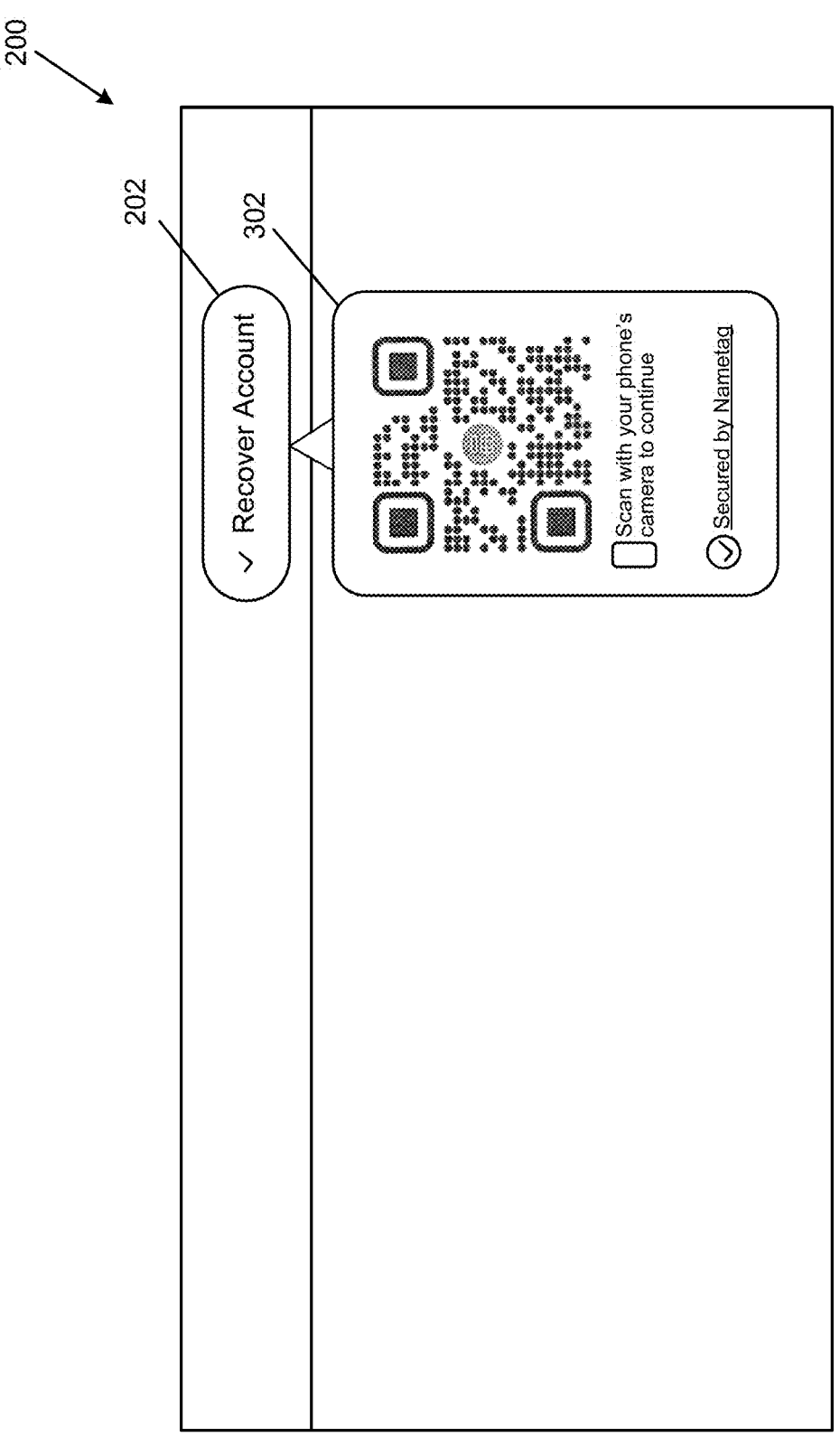
FIG. 3 is a view of a user interface element for initiating authentication on the user interface of FIG. 2, according to an example implementation of the present disclosure.
Figure 4:
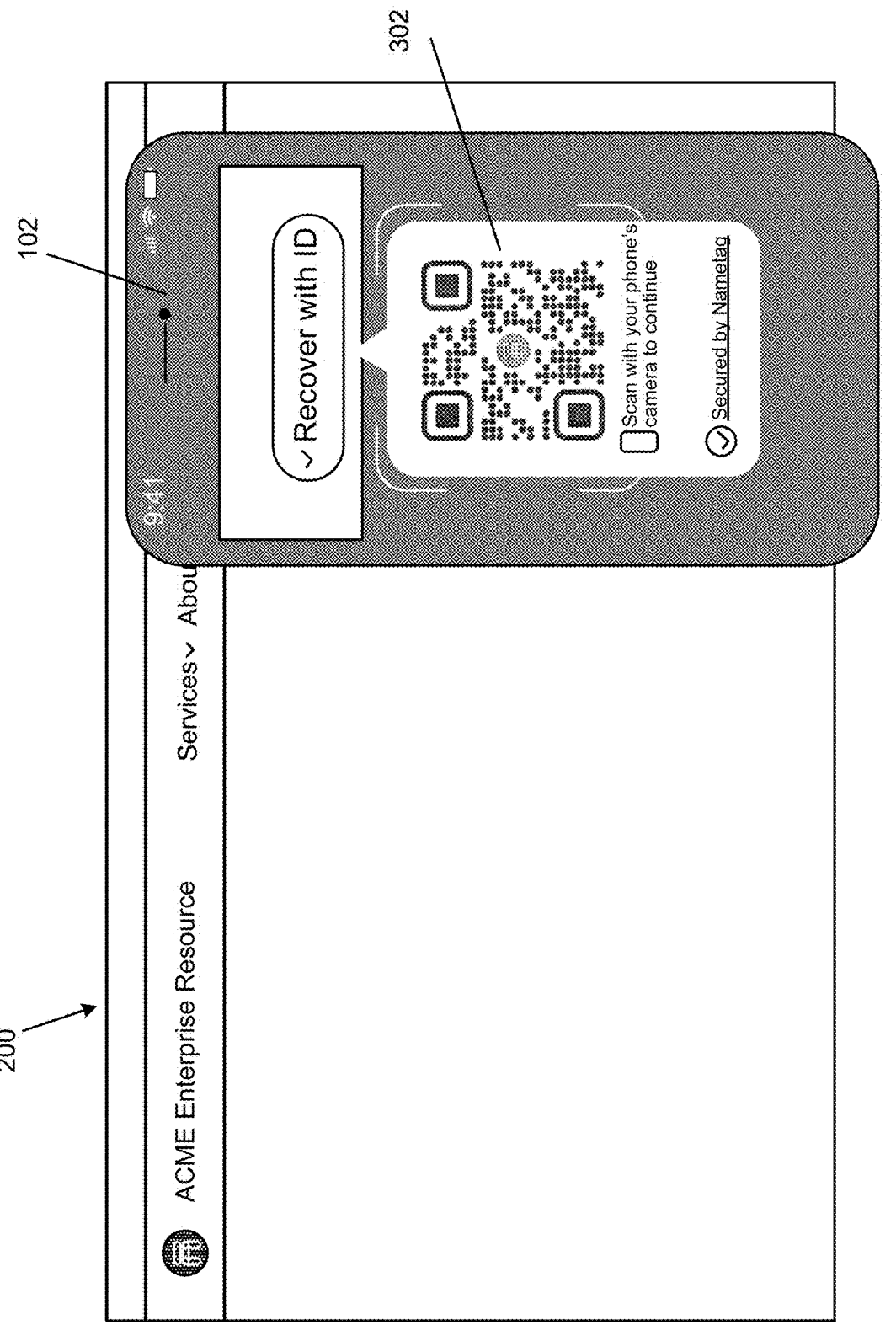
FIG. 4 is a view of a client device interfacing with the user interface element of FIG. 3, according to an example implementation of the present disclosure.

To re-obtain access to the resource 104, the resource 104 may display a user interface element 302 which facilitates account recovery. As shown in FIG. 3, to initiate the request (e.g., for account recovery), the resource 104 may be configured to direct the user to a uniform resource locator (URL) corresponding to the request (e.g., a request URL). The resource 104 may direct the user to the URL by displaying a quick response code which is encoded to direct the client device to the URL (or automatically launch the URL) upon scanning the quick response code. Specifically, FIG. 3 shows a view of a user interface element 202 for initiating authentication on the user interface 200, according to an example implementation of the present disclosure. As shown in FIG. 3, the resource 104 may include a user interface element 202, which may be or include button or toggle, which launches display of a quick response (QR) code 302. In some embodiments, the user may be directed to the request URL through or by way of a text message, a near-field communication NFC) tag, a hyperlink, or some other manner of directly or indirectly launching the request URL on the client device. As shown in FIG. 4, where the QR code 302 is displayed, the user of the client device 102 may be configured to scan (e.g., using the camera(s) 112) the QR code 302 shown on the user interface 200. Upon the user operating a camera 112 of the device 102 to scan the QR code 302, the client device 102 may be directed to the request URL, which is encoded in or otherwise associated with the QR code 302.

Figure 5:
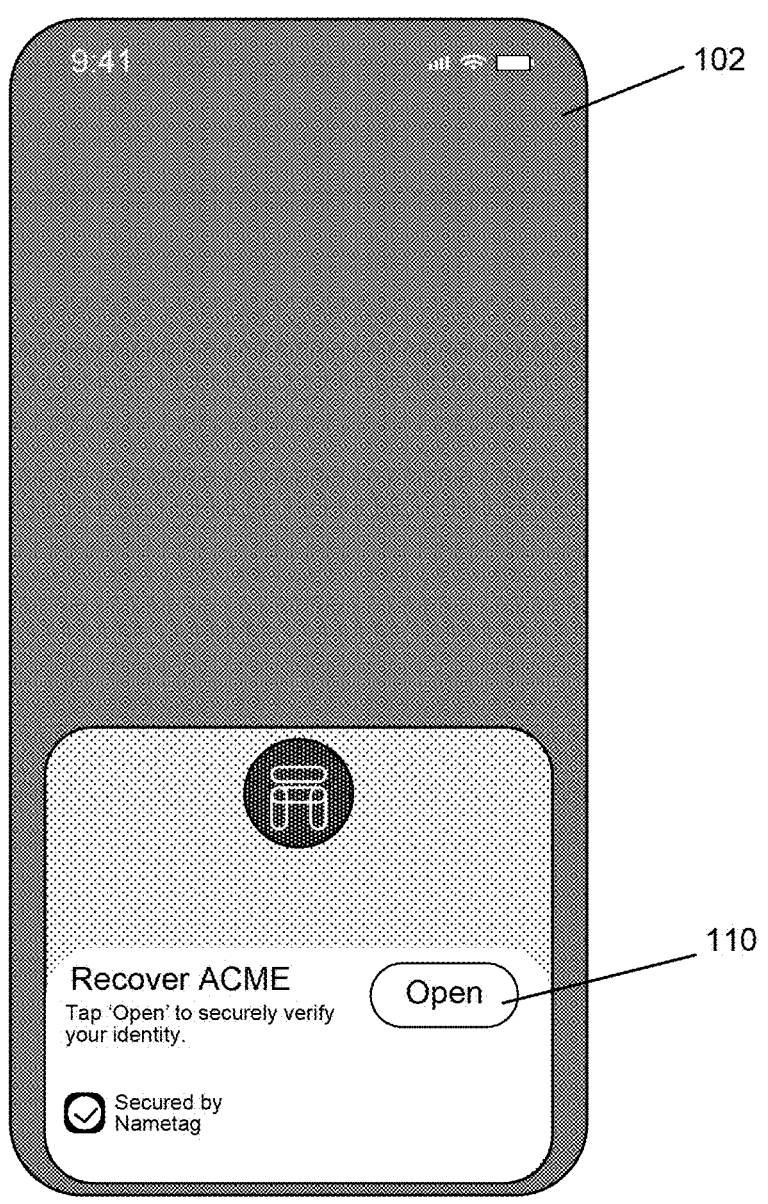
FIG. 5 is a view of a user interface of the client device of FIG. 4, according to an example implementation of the present disclosure.

As shown in FIG. 5, when the client device 102 is directed to the request URL, the authentication service 110 may be configured to launch on the client device 102. The authentication service 110 may be or include an application deployed or otherwise installed on the client device 102, an over-the-air (OTA) installed version of the application (e.g., a miniature version of the application, such as an APPLE App Clip, an ANDROID Instant App, etc.), and the like. For example, where a native application version of the authentication service 110 is not installed on the client device 102, when a user of the client device 102 launches the request URL (e.g., by scanning the QR code), a server receiving a domain name service (DNS) request for the request URL may re-direct the user to launch the OTA-installed version of the application. The authentication service 110 may be deployed on the client device 102 while the initial URL that represents the request (e.g., between the client device 102 and resource server 106) is preserved.

B. Processing the Request

Upon initial launch, the authentication service 110 may be configured to use cryptographic hardware or components of the client device 102 to establish a cryptographic public/private key pair. The public-private key or key pair may uniquely identify or otherwise be associated with the client device 102 ("device key"). This key pair may be configured to be unexportable, meaning it is bound to or otherwise uniquely associated with the particular client device 102. The authentication service 110 executing on the client device 102 may be configured to transmit, send, or otherwise provide the device key (e.g., the public key of the key pair) to the authentication server 108. An account management service 114 of the authentication service 110 may be configured to receive the device key from the authentication service 110 as part of generating an authentication profile 116 for the user of the client device 102. The account management service 114 may be configured to store the device key 118 in association with authentication data 120 and one or more profile images 122 for the authentication profile 116 in an accounts database 124 or some other data structure maintained or accessible by the authentication server 108. In various embodiments, the authentication profile 116 (or portions thereof) may be maintained locally (e.g., at the authentication server 108). In various embodiments, the authentication profile 116 (or portions thereof) may be maintained at a remote server (e.g., managed/owned by/located at a third-party or host site, such as an enterprise server). In such embodiments, the authentication profile 116 may be accessible to the authentication server 108 by, for instance, encrypting data of the authentication profiles for access by the authentication server 108. As one example, the profile images 122 (and/or other personally-identifiable information) may be maintained at a remote server, whereas the device key 118 may be maintained locally at the authentication server 108. The profile images 122 may be or include previously-captured and authenticated images of the user (e.g., authenticated by the authentication server 108 as part of sign-in or authentication to any previous service/resource accessed by the user). In other words, the authentication profile 116 for a user may include a plurality of profile images 122 which include known/verified/authenticated images of the user over time (e.g., a profile image chain), along with other authentication information (e.g., authentication data 120, such as user legal name, home address, date of birth, and so forth). Some of the authentication information may be static/immutable (such as a date of birth, social security number, etc.). Other authentication information may change over time (e.g., address, legal name, etc.).

The authentication service 110 may be configured to inform, indicate, instruct, or otherwise identify (e.g., to an online service 126 of the authentication server 108) that the authentication service 110 is performing, handling, or otherwise initiating providing authentication that corresponds to the request URL (e.g., specified or indicated by the QR code 302). The online service 126 may indicate, e.g. to a request service 128, that the authentication service 110 on the client device 102 is being used to authenticate the user for the request URL. The request service 128 may maintain the session identifiers associated with each request URL. The session binding service 130 may be configured to bind the request URL to the device key of the client device 102, which is executing the authentication service 110, thus ensuring that only one device can handle a request.

An evidence validation service 132 may be configured to determine the evidence needed for satisfying the authentication request to the resource server 106. Evidence, as used herein, refers to information, data, or the like which is supplied by a user in support of authentication. Evidence may include information which is used for comparison to authentication data 120 stored in the authentication profile 116 for the user. For example, evidence may include biometric images which are compared to profile images 122, a date of birth or address which are compared to the date of birth or address from the authentication profile 116, etc. The evidence validation service 132 may be configured to determine the evidence needed for satisfying the request based on data from the request URL. For example, the request URL may include or identify particular types of data needed for authenticating the user. Additionally or alternatively, the evidence validation service 132 may be configured to determine the evidence needed for satisfying the request by requesting such information from the resource (e.g., through one or more application program interface (API) calls). Additionally or alternatively, the evidence validation service 132 may be configured to determine the evidence needed for satisfying the request by accessing stored information maintained for a number of different resources (including the resource 104). The evidence validation service 132 may be configured to determine current or existing authentication data 120 stored in the authentication profile 116 and provided by the user. For example, the authentication data 120 may be indexed according to a type or category of authentication data 120, along with flags indicating whether each entry of the authentication data 120 has been validated. The evidence validation service 132 may be configured to determine, based on the specific information provided and stored in the authentication profile 116, if the individual has already provided enough evidence to satisfy the request, and if that evidence has been validated.

The evidence validation service 132 may be configured to determine which types of evidence are to be used, or available for use, in satisfaction of the request. To determine which types of evidence are to be used, the evidence validation service 132 may be configured to maintain a plurality of rules and tags associated with corresponding evidence maintained or obtainable for the user. For example, if the resource 104 (or resource server 106) requests a validated profile picture for acceptable authentication, the user should provide a driver license or passport or some other identity or identification document (ID), but could also provide a profile photo. However, where an ID is provided but not a separate profile photo, the evidence validation service 132 may be configured to extract the profile photograph from the ID. Additionally or alternatively, if a separate profile photo is provided, the evidence validation service 132 can be configured to confirm that the profile photo contains exactly one face and that face should match the face on the ID. The evidence validation service 132 may be configured to instruct the authentication service 110 which evidence has been provided, which is needed to complete the request, and if the request can yet be satisfied.

In some embodiments, and as described in greater detail below in Section 2, the evidence validation service 132 may be configured to determine which types of identity information are stored at the resource server(s) 106 for comparison against evidence received from a user. For example, the resource 104 may be configured to identify, indicate, or otherwise provide information relating to identity information stored at the resource server(s) 106—or otherwise accessible via the resource 104—which can be used to recover the account of the end user. The identity information can include, for example, user name, user images (e.g., from a company website or user profile), date of birth, home address, and so forth. As described in greater detail below, the authentication server(s) 108 may be configured to compare the identity information from the resource server(s) 106 for comparison against the authentication data received from the end user, to recover the user's account with the resource 104.

Figure 6:
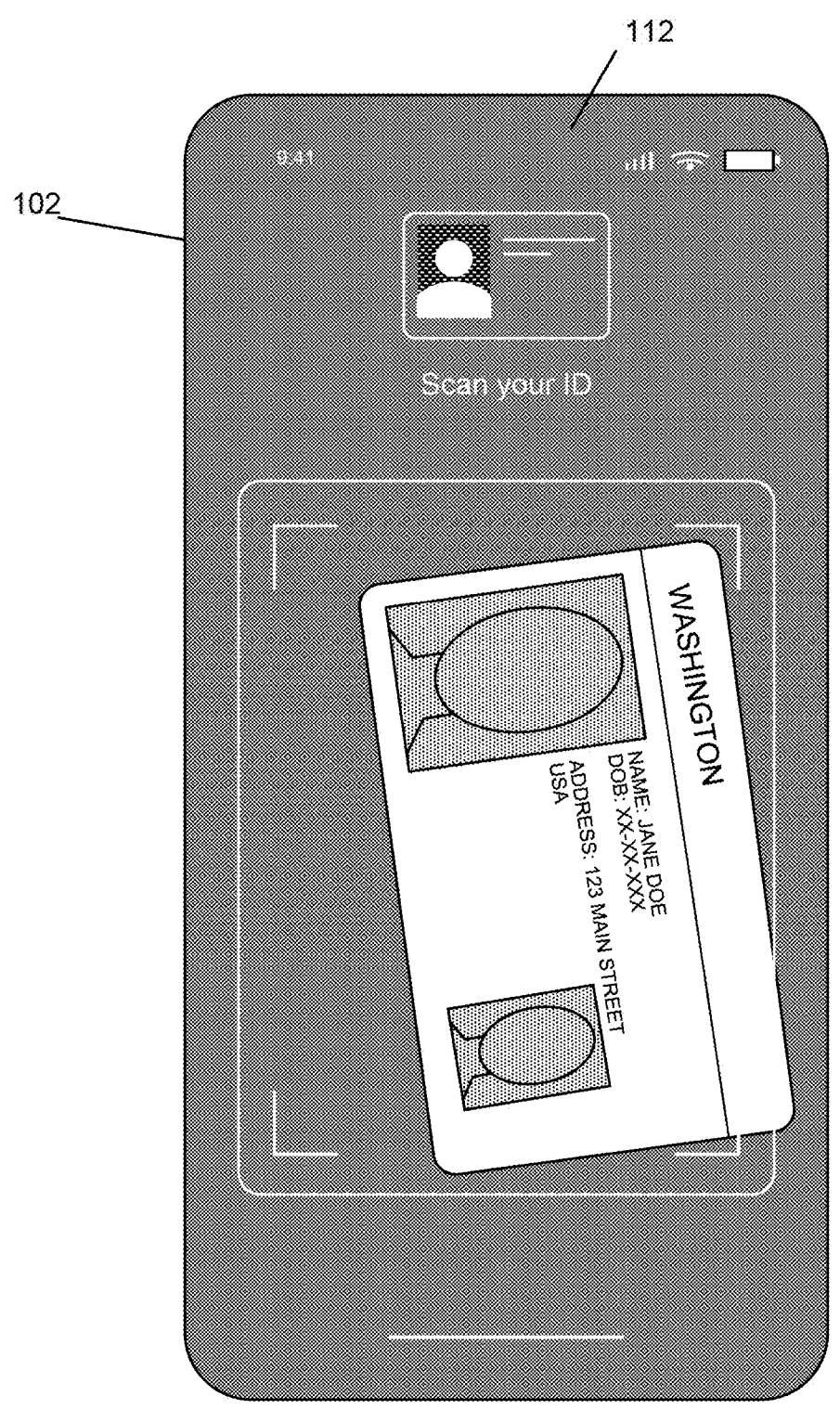
FIG. 6 is a view of a user interface of the client device of FIG. 4 for scanning an identification document (ID) of a user, according to an example implementation of the present disclosure.
Figure 7:
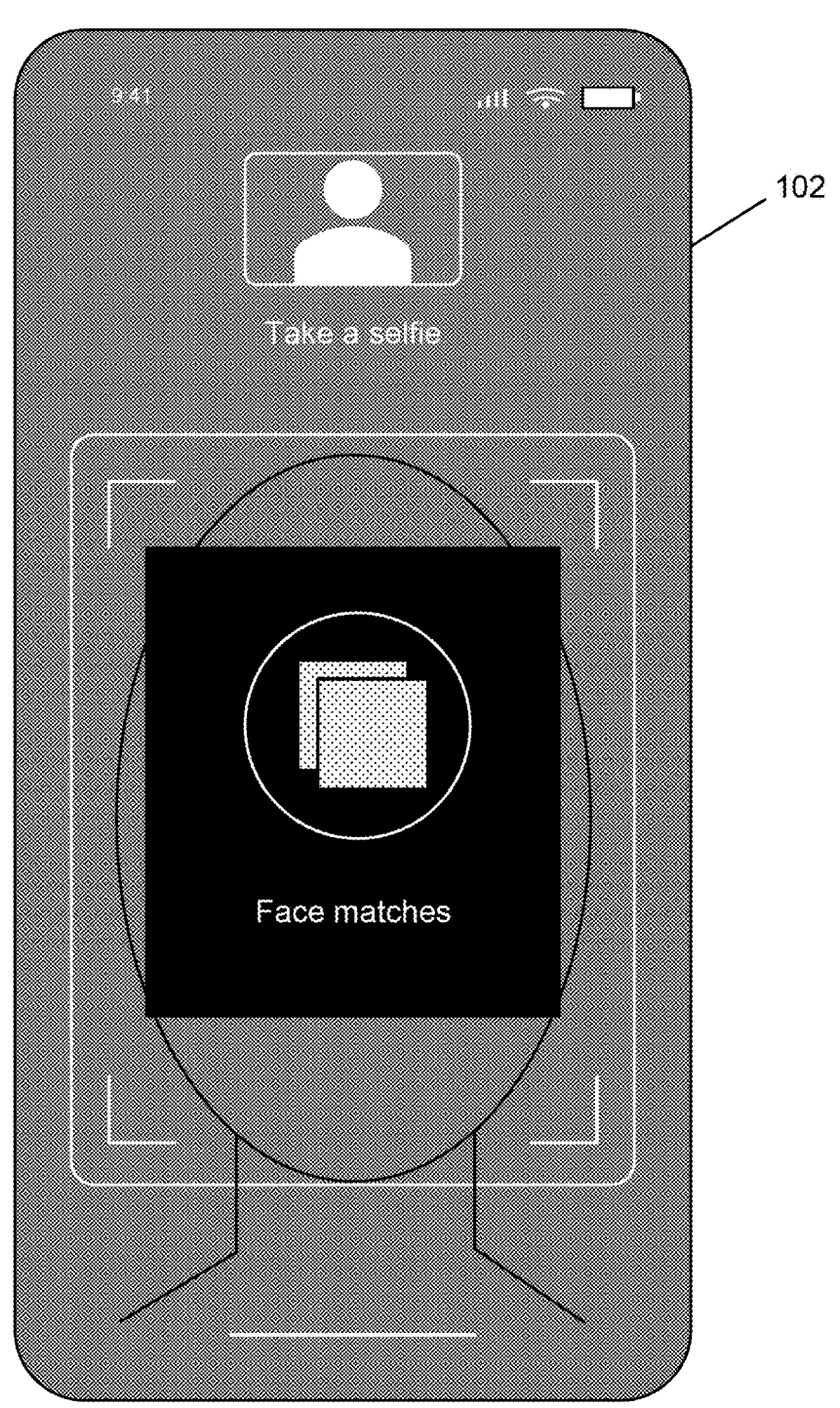
FIG. 7 is a view of a user interface of the client device of FIG. 4 for capturing a biometric image of a user, according to an example implementation of the present disclosure.

As shown in FIG. 6 and FIG. 7, to collect evidence, the authentication service 110 may be configured to activate the camera(s) 112 of the client device 102 to obtain, capture, or otherwise receive the evidence. In some embodiments, the client device 102 provides video frames to the authentication service 110. For each video frame, the authentication service 110 may be configured to apply one or more computer vision tools to determine if the image is likely to be an acceptable form of the desired evidence, and that the image is of sufficient quality. The authentication service 110 may be configured to perform an initial (or first) analysis on each of the video frames captured by the device camera to determine the quality of each frame. The initial or first analysis may be or include high-performance but slightly lower fidelity analysis. If the authentication service 110 determines that the image is likely to be accepted, and of high enough quality, then the frame can be captured and passed to the authentication service 110 for a second (or subsequent) analysis for validation. For example, to determine if a video frame contains a valid image of the back of a North American driver license, the authentication service 110 may be configured to check, verify, or otherwise determine that the PDF-417 barcode is present on the back of driver's license. The authentication service 110 may be configured to use object detection to determine the dimensions of the primary object in the image, and ensures that the object's bounding box is sufficiently far from each edge of the frame, to ensure that the card is fully within the frame. The authentication service 110 may be configured to use machine vision tools, such as Laplacian operator(s) or other functions, to verify the image as sufficiently clear, brightness, etc. within a specified acceptable range.

In some embodiments, the authentication service 110 may be configured to determine a type of evidence based on video frames captured via the camera(s) 112 of the client device 102. For example, prior to video capture, the authentication service 110 may be configured to receive, from the authentication server 108, a list of keywords associated with each type of evidence or credential document. The list of keywords may include, for example, "driver," "license," "vehicle," "automobile," "passport," "operator," and the like. Each keyword may include a flag or identifier indicating that the credential document has two sides to be imaged or a single side to be imaged. As part of the initial or subsequent analysis by the authentication service 110, the authentication service 110 may be configured to apply or perform an optical character recognition (OCR) to identify characters in the credential document captured in the video frame(s).

The authentication service 110 may be configured to compare the identified characters to the list of keywords received from the authentication server 108, to determine whether a certain keyword (or keywords) are included in the evidence or credential document captured in the video frame. For example, where the credential document includes a keyword of "DRIVER" or "LICENSE," the authentication service 110 may be configured to determine that the credential document has two sides to be imaged or scanned (e.g., both the front and the back of the driver's license) based on the flag or identifier associated with the keywords identified in the credential document. Additionally, where the credential document includes keywords indicating that the document is a passport, the authentication service 110 may be configured to determine that the credential document has one side to be imaged or scanned (e.g., only the front side of the passport) based on the flag or identifier associated with the keywords identified in the credential document.

Where a keyword is identified indicating that the credential document has two sides to be imaged, the authentication service 110 may be configured to prompt the user to capture video frames of the second side of the credential document. Upon capturing the video frame(s) of both the front and back-side of the credential document, the authentication service 110 may be configured to transmit, send, or otherwise provide the captured frames (e.g., front and back-side, or single side) to the authentication server 108, and the authentication server 108 may be configured to verify the evidence in the captured frames as described in greater detail below in Section 1(C). In some embodiments, the frames provided by the authentication service 110 to the authentication server 108 may not include any of the text data/keywords/flags identified by the authentication service 110 (e.g., the authentication service 110 may disregard or discard the text captured by performing the OCR locally at the client device 102). By performing OCR locally at the client device 102, the authentication service 110 may be configured to determine that the video frames have sufficient quality for imaging the credential document (e.g., since the video frames are sufficiently clear to detect characters within the image), and the authentication service 110 can determine whether the type of credential document (e.g., based on the keywords) indicates that two sides of the credential document are to be imaged. As such, by determining whether the credential document has two sides based on the video frames, the user may not be prompted to enter the type of credential document being scanned.

For certain images, for example when taking a facial image (also referred to as a "biometric image" of the person holding the client device 102), the authentication service 110 may be configured to use face detection to ensure that the face is fully within the frame, that it is oriented directly at the camera 112, and that all required facial features (eyes, nose, mouth) are detected and of proper scale within the frame. On client devices 102 that support capturing of depth map or data with images, the authentication service 110 may be configured to augment an image with a depth map, which provides a three-dimensional image of the object being captured. If the image is not accepted, the authentication service 110 may be configured to determine the reason for rejection and displays a hint to the user ("too dark", "face not in frame", etc.) that guides the individual to capture an acceptable image.

Upon determining that the image is acceptable, the authentication service 110 may be configured to transmit, send, or otherwise provide the captured image (e.g., along with a depth map in some implementations) to the authentication server 108. In some embodiments, the authentication service 110 may be configured to use platform or operating system features to gather a cryptographic assertion that the image was captured on a genuine client device 102 using a genuine version of the authentication service 110 which was cryptographically signed by authentication service 110. Because the authentication service 110 only captures images from a hardware camera 112 of the client device 102 (e.g., and does not permit uploading or using stored images), this prevents a potential attacker from re-implementing the authentication service 110 to transmit a digitally manipulated image of the evidence to the authentication server 108.

Some systems may use web platforms to capture evidence of identity documents. Because of the nature of the web platform, they accept and account for the risk that the images they receive may have been digitally manipulated. This is because a fraudulent actor could impersonate their web application, or use a virtual camera to give the impression that a picture was taken, when actually a digitally manipulated image was provided. The image processing required to detect these digitally manipulated images may be complex and unreliable.

To mitigate this risk, the systems and methods described herein limit capturing of images to the hardware camera 112 of the client device 102. To gain confidence that the communications received by the authentication server 108 are from the client device 102, the authentication service 110 may be configured to use operating system or platform features of the client device 102 to embed a digital attestation that the client device 102 used to capture the image has not been manipulated (e.g. jail broken) and that the authentication service 110 running or executing on the client device 102 has been digitally signed by the authentication service 110 and distributed through an authorized mechanism (e.g. an authorized application store of the client device 102). The authentication server 108 may be configured to independently verify the assertion with the hardware vendor corresponding to the client device 102. Because the authentication service 110 can only be deployed on client devices 102 having a hardware camera 112, the authentication service 110 need not account for the possibility that a fraudulent actor will present digitally manipulated evidence images.

C. Verifying Evidence

Upon receiving evidence from the authentication service 110, the evidence validation service 132 may be configured to validate the image received. For identity documents, the evidence validation service 132 may be configured to extract text from the front of the document and compare it to information decoded (e.g., by the evidence validation service 132) from an encoded barcode on the back or rear image of the identity document. In some embodiments, the evidence validation service 132 may be configured to pass the images through one or more machine learning or artificial intelligence systems, such as one of those shown and described with reference to Section 3. The machine learning or artificial intelligence systems may be trained on known-valid images. When a depth map is provided, the evidence validation service 132 may be configured to pass the depth map to machine learning or artificial intelligence systems trained on similar, known-valid images. The machine learning or artificial intelligence systems may also be trained to detect classes of known-fraudulent images, such as images taken of computer screens or pieces of paper. An image is deemed acceptable if it matches the models for known-valid evidence and does not match any model for a known-fraudulent image.

In some instances, where an individual provides the front and back of an identity document followed by a biometric image (e.g., a facial image of a user holding the client device 102), the evidence validation service 132 and/or the biometric validation service 134 may analyze each of the images (e.g., the facial or biometric image, the front image of the identity document, and the rear image of the identity document) in parallel, rather than waiting for all evidence to arrive. By performing the analysis in parallel, the systems and methods described herein may improve the latency of the analysis by performing initial analysis in the background while the individual is in the process of capturing additional images. For example, if the user captures an image first of the front of the user's ID, then of the rear of the user's ID, then a biometric image of the user, the evidence validation service 132 may analyze each of these images in parallel rather than waiting for all evidence to be sent by the authentication service 110 to the authentication server 108.

Once input images have been collected, and data extracted successfully, the evidence may be marked as validated, and bound to the particular device key (e.g., by storing the validated data as authentication data 120 in association with the device key 118 in the authentication profile 116). The evidence validation service 132 may be configured to store, update, or otherwise incorporate the data (e.g., as authentication data 120) in an authentication profile 116 for the user which is uniquely associated with the device key 118 for the client device 102. If the evidence cannot be validated by the evidence validation service 132, the evidence validation service 132 may be configured to store the data in the authentication profile 116 with an indicator or other identifier noting that the evidence is not validated, and forward the evidence (e.g., the image(s)) to an admin device associated with the authentication server 108 for manual review and determination of the disposition of the evidence. Where manual review is provided and the evidence is validated (or invalidated), the feedback can be fed into the machine learning or artificial intelligence systems to further improve the fidelity of automated determinations.

D. Completing Authentication

When the request has been completed, and evidence is successfully validated against information from the resource server 106 as described below in Section 2, the authentication server 108 may be configured to communicate, transmit, send, or otherwise provide a signal to the resource server(s) 106 indicating an authentication status of the user. For example, where the evidence is successfully validated against the information from the resource server 106, the signal may indicate successful validation (e.g., an authentication status of successful authentication). In response to successful validation, the resource server 106 may rebind the end user with the user's account at the resource 104. For example, the resource server 106 may permit or trigger a password reset or recovery for the user's account with the resource 104. As another example, the resource server 106 may re-bind the user's account with the resource 104 with the device key 118 of the client device 102.

2. Systems and Methods for Authentication to Resource Servers

Account binding is a process by which a person or user's resource account (e.g., an enterprise account, directory account, etc. with an employer/enterprise/company) is bound with their authentication profile, with their identity verified based on data captured from the user's identity document. A challenge arises because government identity documents contain demographic/identity information which may not match certain identity information held by/accessible at the enterprise-level. For example, an identity document may include the user's legal name, date of birth, and photograph, whereas an enterprise-level account may include a preferred name and unique account identifier (e.g., an email address, a user ID number, etc.). Some enterprise software suits may include resources that include profile photos (e.g., a corporate directory including photographs of users), resource(s) that include dates of birth (e.g., human resource (HR) resources or services), and so forth. These discrepancies in available data may make it more difficult to bind accounts to identities.

To solve this problem, the systems and methods described herein may include an authentication server which receives a request to authenticate a user to a third-party resource hosted on a resource server. The authentication server may receive an image of an identification document (ID) including user identity information for the user from a client device. The authentication server may retrieve, from the resource server, stored information relating to the user which corresponds to the user identity information. The authentication server may compute a match score of at least a portion of the stored information from the resource server and at least a portion of the user identity information, and transmit a signal to the resource server which indicates an authentication status of the user for accessing the third-party resource according to the match score.

As one non-limiting example, the authentication server may receive a request from an employee of an enterprise, to recover the employee's account with an enterprise resource. The employee may capture an image of the employee's driver's license (e.g., which includes the employee's legal name, date of birth, home address, and an image of the employee's face). The authentication server may retrieve employee information (e.g., relating to the account which is to be recovered) from the enterprise server(s) (e.g., from the enterprise's corporate directory, HR software service/resources, etc.). Such employee information may include, for instance, the employee's preferred name, profile image, date of birth, home address, etc. The authentication server may compute a match score based on a portion of the information included in the driver's license with the employee information from the enterprise server(s). As an example, the authentication server may compute a match score based on the employee's legal name (e.g., from the driver's license) and preferred name (e.g., from the corporate directory), which may be appended with additional information (e.g., image of the employee's face from the driver's license and profile image from the corporate directory, date of birth from the driver's license and date of birth from HR software service, home addresses, and so forth). The authentication server may transmit a signal to the resource server indicating the authentication status (e.g., authentication successful/failed) based on the match score (e.g., satisfying a threshold criterion).

The systems and methods described herein addresses several technical problems related to identity verification and account binding in enterprise (and other) environments. As described above, one technical problem is inconsistency between the identity information contained in identity documents and the data stored/accessible via resource servers. For instance, a user's legal name on an identity document may not match the preferred name stored in the enterprise's directory, which can result in false negatives for account binding. The systems and methods of the present solution retrieves and compares identity information from both the identity document and information from the resource server. By computing a match score that considers one or more data points (e.g., legal/preferred name, date of birth, profile/ID image, home address), the systems and methods described herein effectively reconcile discrepancies between the data sources. According to the systems and methods described herein, despite variations in the format and content of identity information, the authentication profile of the user (e.g., with the authentication service) can be reliably bound to the resource account, thereby enhancing the accuracy and efficiency of the identity verification process.

Another technical problem is the difficulty in verifying identity when user information is stored across disparate and potentially inconsistent enterprise resources. Information may be spread across enterprise HR software, enterprise directories, and other systems of record, each storing data in different formats. In various embodiments of the present solution, the authentication server may be configured to aggregate and standardize user identity information from various resources (e.g., of the resource server) in connection with computing the match score. By computing a match score based on standardized information, the systems and methods described herein may ensure reliable comparison of identity information, despite complex and disparate data architectures, thereby improving accuracy of the verification process.

The systems and methods described herein also solve technical problems which result in increased security risks relating to unauthorized access to sensitive information of the enterprise resources. Inaccuracies in matching, such as those caused by differences in a user's legal name and their preferred name, could allow malicious actors to exploit vulnerabilities in the identity verification process and gain unauthorized access to enterprise resources. The systems and methods of the present solution may compute a match score that corresponds to an authentication status (e.g., when the match score satisfies a threshold criteria/criterion, the authentication status is set to successful authentication). By considering various combinations of identity information in computing in the match score, the systems and methods described herein may enhance the security of the identity verification and account binding process, making the systems and methods described herein more resistant to attacks and reducing the risk of unauthorized access and more robust against identity spoofing and other forms of cybersecurity attacks.

Additional technical benefits of the systems and methods described herein are provided in greater detail below.

Figure 8:
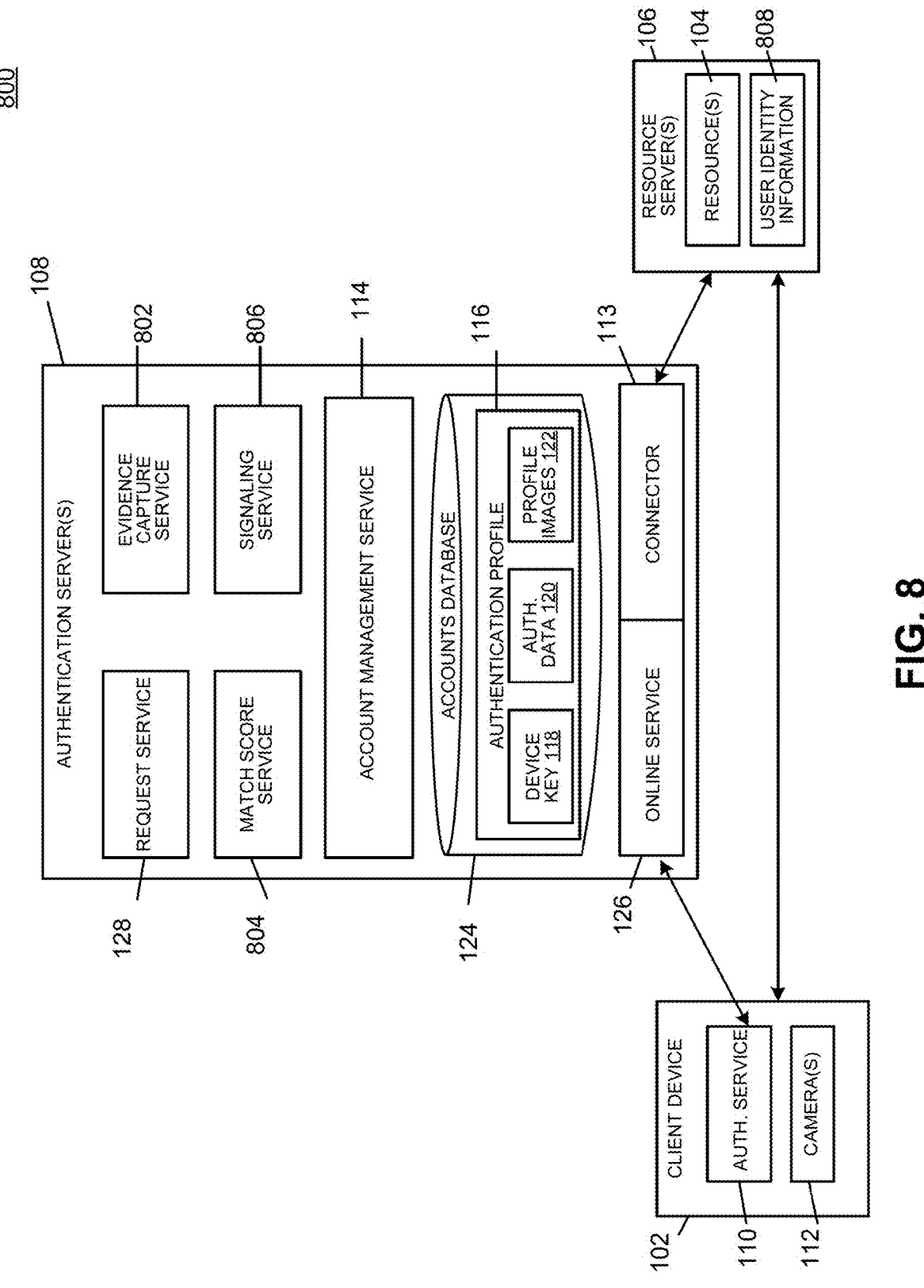
FIG. 8 is a system for authentication to resource servers, according to an example implementation of the present disclosure.

Referring now to FIG. 8, with reference to FIG. 1, depicted is an authentication system 800 for authentication to resource servers, according to an example implementation of the present disclosure. The system 800 may include several of the components, elements, or hardware described above with reference to FIG. 1-FIG. 7. For example, the authentication system 800 may include a client device 102 communicably coupled to one or more resource servers 106 and one or more authentication servers 108. It is noted that several components which were shown in FIG. 1 are omitted from FIG. 8 for clarity purposes. However, the authentication system 800 may include those components, according to various embodiments and iterations of the present solution. Further, the authentication system 100 shown in FIG. 1 may also include the components of FIG. 8.

As shown in FIG. 8, the authentication server(s) 108 may include the request service 128, which may be similar to the request service 128 described above with reference to FIG. 1. The authentication server(s) 108 may include an evidence capture service 802, a match score service 804, and a signaling service 806. Additionally, the resource server(s) 106 may include user identity information 808, which may be stored/maintained across one or more resources 104.

As described in greater detail below, the authentication server 108 (e.g., the request service 128) may be configured to receive a request to authenticate a user to a third-party resource hosted on a second server (e.g., a resource 104 hosted on the resource server 106). The authentication server 108 (e.g. the evidence capture service 802) may be configured to receive, via a session between the authentication server 108 and the authentication service 110 executing on the client device 102, an image of an identification document (ID) including user identity information for the user. The authentication server 108 (e.g., the evidence capture service 802) may be configured to retrieve stored information (e.g., user identity information 808) from the second server (e.g., the resource server 106) that relates to the user and corresponds to the user identity information. The authentication server 108 (e.g., the match score service 804) may be configured to compute a match score of at least a portion of the stored information from the second server and at least a portion of the user identity information. The authentication server 108 (e.g., the signaling service 806) may be configured to transmit a signal to the second server that indicates an authentication status of the user for accessing the third-party resource, according to the match score.

The authentication server(s) 108 may include the request service 128, which may be similar to the request service 128 described above. In the embodiment shown in FIG. 8, the request service 128 may be designed or configured to receive a request to authenticate a user to a resource 104 hosted on a server (e.g., the resource server 106). As shown in FIG. 2 and FIG. 3, a user navigating to a particular resource 104 hosted on a server, may select a user interface element 202 to recover their account with the resource 104. Upon selection of the user interface element 202, the server 106 may be configured to transmit, communicate, or otherwise provide the request to the authentication server(s) 108. While shown as a dedicated button on the user interface 200, in various embodiments, the user interface element 202 may be displayed following a series of unsuccessful login attempts to the resource 104. For example, the user interface element 202 may be displayed on the user interface 200 responsive to the user's account with the resource 104 being locked out. The request may include various information relating to the user and/or the user account with the resource 104 of the resource server 106. For example, the request may include a user identifier associated with the user's account with the resource, a permission level or a user designation associated with the user account, and so forth.

The authentication server(s) 108 may include an evidence capture service 802. The evidence capture service 802 may be configured to receive authentication information from the client device 102. The evidence capture service 802 may be configured to receive authentication information in a manner similar to what is described above with reference to FIG. 1-FIG. 7. For example, the evidence capture service 802 may be configured to receive, as authentication information, a biometric image and one or more images of the user's identity document. The evidence capture service 802 may be configured to compare the biometric image with the facial image of the user's face on the identity document, as described above. The evidence capture service 802 may be configured to extract user attributes from the identity document (e.g., using optical character recognition), in a manner similar to what is described above with reference to FIG. 1-FIG. 7. The user attributes may include, for example, immutable identifiers (e.g., a date of birth, social security number, or other fixed/non-changing identifiers), other identifiers (e.g., legal name, residence information, etc. The user attributes, together with the biometric image and/or facial image, may together form user identity information. As described in greater detail below, the authentication server(s) 108 may be configured to use the user identity information to compare against corresponding user identity information from the resource server(s) 106, to bind an account of the resource 104 with the authentication profile 116 of the user with the authentication server(s) 108.

The evidence capture service 802 may be configured to receive, identify, obtain, or otherwise retrieve stored information relating to the user which corresponds to the user identity information (e.g., received from the client device 102). In some embodiments, the evidence capture service 802 may be configured to receive the stored information from the resource server(s) 108 on demand (e.g., responsive to a user request). In other words, the evidence capture service 802 may be configured to retrieve the stored information from the resource server which corresponds to the user identity information received from the client device 102. In some embodiments, the evidence capture service 802 may be configured to receive the stored information at a first time instance (e.g., at integration or interfacing between the resource server 106 and the authentication server(s) 108). The evidence capture service 802 may be configured to use the stored information at a subsequent time instance (e.g., following receipt of the request). In this regard, the evidence capture service 802 may be configured to use previously-received information relating to users having accounts with the resource 104, which corresponds to a request.

As shown in FIG. 8, the resource server(s) 108 may be configured to maintain, include, incorporate, or otherwise access user identity information 808. In some embodiments, the user identity information 808 may be stored in a plurality of locations (e.g., across different resources/services/etc. of the resource server(s) 106. For example, the user identity information 808 may be stored in a data structure or store associated with a human resources (HR) service accessible to the resource server(s) 108, in a data structure or store associated with a user directory service (e.g., an email or user profile directory service), and so forth. The user identity information 808 may include preferred name, legal name, current address, profile pictures, and so forth.

The authentication server(s) 108 may be configured to retrieve or otherwise receive the user identity information 808 through various different data integration techniques, such as a directory integration, an API of the authentication server(s) 108, a file import, and so forth. Various examples of these data integration techniques are described in greater detail below.

In some embodiments, the authentication server(s) 108 may be configured to establish a connection with a directory of the resource server(s) 106. For example, an administrator of the resource server 106 may be configured to integrate a directory service with the authentication service through a software development kit. In this regard, where user identity information 808 is stored in the directory, the authentication server(s) 108 (e.g., the evidence capture service 802) may be configured to retrieve such information from the directory service without any further actions at the admin level.

In some embodiments, the authentication server(s) 108 may be configured to receive the user identity information 808 via an exposed application program interface (API) of the authentication server(s) 108. For example, an administrator may be configured to establish a connection with or otherwise integrate with the exposed API of the authentication server(s) 108, to facilitate communication between the authentication server(s) 108 (e.g., via the exposed API). In this example, the API of the authentication server 108 may be configured to provide an interface through which external systems can interact with the authentication server 108 (e.g., to retrieve, update, and compare user identity information). Using the API of the authentication server 108, external applications/resources 104 (such as HR services, directory services, or custom third-party systems) may be configured to submit requests to query or provide user identity information 808. For example, the resource server 106 may use the API to submit user identity information 808, which may include legal names, profile photos, and birth dates, to the authentication server 108.

In some embodiments, and referring briefly to FIG. 9A and FIG. 9B, the authentication server(s) 108 may be configured to retrieve identity information via a file import. Specifically, FIG. 9A and FIG. 9B show user interfaces for initiating a file import of stored user identity information, according to an example implementation of the present disclosure. The file imported may be a comma separated value (CSV) file format, a data compressed file (e.g., a zip file), or any other type of file which can be used to import user identity information. To import a CSV file, administrators of the resource server(s) 106 may batch upload user identity information into the authentication server(s) 108. For example, and as shown in FIG. 9A, an admin may select particular directories (or a single directory) which are to be imported into the authentication server(s) 108. Once the directory(s) are selected, the admin may select (e.g., via the second interface shown in FIG. 9B) columns with specific identity information (e.g., legal name, preferred name, date of birth, profile image, current mailing address, and other identifying information) and a mapping of each column of the CSV file to corresponding fields with the authentication server(s) 108. For example, a column labeled "Name_legal" in the CSV file may be mapped to a Legal name field used by the authentication server(s) 108. Once mapped, the user identity information from the CSV file may be integrated into the existing authentication profile(s) 116 within the authentication server(s) 108. The zip file import may provide a similar functionality, but may also be configured to facilitate uploading profile images and/or other media files associated with the user accounts (e.g., within the directory service). For example, within the zip file, administrators may upload a zip archive including image files, with each file name corresponding to a specific user account (e.g., "john.doe@example.com.jpg"). The authentication server 108, upon receiving the zip file, may be configured to extract and associate the images with the appropriate authentication profiles 116 in the authentication server(s) 108.

In some embodiments, the evidence capture service 802 may be configured to apply one or more policies to information from the request, to determine one or more types of information to retrieve or otherwise use for comparison with the user identity information received from the client device 102. In some embodiments, the policies may be set or defined by an admin of the resource server 106 (e.g., for each of the resources 104 of the resource server 106 and/or different policies for different resources 104 of the resource server 106), may be predefined for the authentication server(s) 108, and so forth.

Referring now to FIG. 10, depicted is a user interface for configuring one or more policies for applying to users of the resource server 106, for determining types of stored information, according to an example implementation of the present disclosure. In some embodiments, the policies may be configured and applied for each of the users for a given resource 104. In some embodiments, the policies may be configured for groups of users (e.g., groups having a common user designation, groups being from the same department, etc.). The policies may be configured based on a type of request (e.g., request for multi-factor authentication (MFA) reset, a request for a password reset, a request for recovering or unlocking a locked account, and so forth). Each of these types of request may generally be referred to as a rebinding request. An admin of the resource server 106 may be configured to establish or otherwise configure the policy (e.g., via the user interface of FIG. 10), on a per request type and per group of user. While this level of policy configuration is shown, it should be understood that similar policies may be configured for different resources of an entity or enterprise (e.g., which may use the same or similar stored information). The policies may be or include rules or configurations for types of information which can be used for comparison, for computing a match score between the user identity information received from the client device 102 and stored information from the resource server 106. For example, and as described in greater detail below, the configurations may include a name only configuration, a name and birthday configuration, a profile photo configuration, a security assertion markup language (SAML) binding configuration, or a disabled setting.

In some embodiments, an admin may configure a policy (e.g., for a particular group of users), to use a name configuration. In this configuration, the authentication server 108 (e.g., the evidence capture service 802) may be configured to retrieve or otherwise receive the preferred name or stored name in the resource server 106, for comparison with the legal name from the user identity information obtained from the client device 102 (e.g., from an identification document). In this example, the name-only match may provide a lightweight form of authentication, where a match score (e.g., as described in greater detail below) is based on the similarity between the names. The name configuration policy may be effective in instances where users have unique names, or for environments where a high assurance level is of less of a concern.

In some embodiments, an admin may configure a policy (e.g., for a particular group of users), to use a name and birthday configuration. In this configuration, the authentication server 108 (e.g., the evidence capture service 802) may be configured to retrieve or otherwise receive the preferred name or stored name, and date of birth in the resource server 106, for comparison with the legal name and date of birth from the user identity information obtained from the client device 102 (e.g., from an identification document). This dual-attribute verification method may provide a higher level of assurance compared to name-only matching, as the combination of name and date of birth may reduce the likelihood of false positives.

In some embodiments, an admin may configure a policy (e.g., for a particular group of users) to use a profile photo configuration. In this configuration, the authentication server 108 (e.g., the evidence capture service 802) may be configured to retrieve or otherwise receive a profile photo stored in the resource server 106 for comparison with the facial image from the user identity information obtained from the client device 102 (e.g., facial image from an identification document or a live biometric image). In some embodiments, the evidence capture service 802 may extract key features from the profile photo and the facial image (e.g., facial landmarks, geometric ratios) for comparison (e.g., by the match score service 804), in a manner similar to the evidence validation service 132 and/or biometric validation service 134 described above.

In some embodiments, for the name configuration and/or the name and birthday configuration, the evidence capture service 802 may be configured to apply the legal name and/or the preferred name to a model, to determine a uniqueness score associated with the name. For example, the model may be trained or otherwise configured to receive, as an input, the name of a user (e.g., legal or preferred name), and compute the uniqueness score as a measure of an estimated count of matching names per X number of persons (e.g., N/X, where N is the estimated count of matching persons and X is the sample set, such as one thousand persons, one million persons, and so forth). In this regard, the uniqueness score may estimate a likelihood of multiple persons with the same name attempting the account recovery. For example, if a user's name is John Smith, the uniqueness score may increase due to the high degree of likelihood of multiple persons with the same name. However, if the user's name is more unique, the uniqueness score may decrease, indicating a more unique name due to a lower degree of likelihood of multiple persons with the same name.

The evidence capture service 802 may be configured to apply the uniqueness score to a threshold criterion, to determine whether additional evidence may be used to support authentication and verification of the user. For example, where the uniqueness score is greater than the threshold criterion, the evidence capture service 802 may be configured to retrieve or otherwise use additional information to support authentication and verification of the user (e.g., city and state of residence, date of birth, profile photo, and so forth, which correspondingly decreases a likelihood of the person with the same legal name having, e.g., the same date of birth, same city and state of residence, etc. as the user).

In some embodiments, an admin may configure a policy (e.g., for a particular group of users), to use a SAML binding configuration. In this configuration, the authentication server 108 (e.g., the evidence capture service 802) may be configured to facilitate authentication through a Security Assertion Markup Language (SAML) single sign-on (SSO) process. In this setup, the authentication server 108 establishes a binding between the user's authentication profile 116 and their credentials stored with a resource 104 which supports SAML. The SAML binding allows the user to authenticate once with the resource 104 (e.g., prior to any account recovery or rebinding process), which then generates and sends an assertion to the authentication server 108, verifying the user's identity without needing to re-enter credentials for each resource 104 or application.

Once the SAML binding is established, the authentication server 108 may process the SAML assertion, which contains user identity attributes. such as username, email address, or other identifying information, to confirm the users identity for accessing a third-party resource 104 hosted on the resource server 106. In this example, the user may perform an initial binding using one or more of the aforementioned configurations (e.g., name matching, name and date of birth matching, profile photo matching, and so forth), to establish a SAML assertion within the authentication profile 116. Once the SAML assertion is established and generated within the authentication profile 116, the authentication server(s) 108 can process subsequent rebinding requests for the resource 104 (and any other resources 104 accessible via the resource server(s) 106) in a streamlined manner.

In some embodiments, the evidence capture service 802 may be configured to apply a policy to the user identity information received from the client device 102 and/or the request, to select the type of information to retrieve or otherwise use for comparison. For example, the evidence capture service 802 may be configured to apply a policy to the user designation, to determine which group the user belongs to, and apply the policy to the request, to determine what type of rebinding request the user is attempting, and select the type of information for use to compare with the user identity information received from the client device 102. Continuing the example from FIG. 10, where the user has a user designation indicating a legal group, the evidence capture service 802 may be configured to select the type of information to use as a profile photo, where the user is attempting to reset their multi-factor authentication.

Referring back to FIG. 8, the authentication server(s) 108 may include a match score service 804. The match score service 804 may be designed or configured to determine, calculate, or otherwise compute a match score between the information obtained by the evidence capture service 802 (e.g., the user identity information received from the client device 102 and the stored information retrieved or otherwise received from the resource server(s) 106). In some embodiments, the match score may be or include a probability of a match between the user identity information and the stored information (e.g., indicating that the user identity information and the stored information relate to the same person). The match score may increase as the probability increases. The match score service 804 may be configured to compare the user identity information and the stored information, to compute the match score.

In some embodiments, the match score service 804 is configured to compute a match score based on a comparison between the user identity information received from the client device 102 and the stored information retrieved from the resource server(s) 106. The match score may represent the likelihood that the user identity information provided by the user (e.g., from the client device 102) corresponds to the stored information (e.g., from the resource server(s) 106). The match score may change based on or according to the type and number of attributes being compared. For example, where the match score service 804 performs a comparison using a name configuration, the match score service 804 may calculate a match score by evaluating the degree of similarity between the legal name obtained from the identification document and the preferred name stored in the resource server(s) 106. In this configuration, the match score service 804 may execute a character matching algorithm which compares variations in the name, such as abbreviations, nicknames, or common misspellings. For instance, if the user's legal name is "Jonathan Smith" and the stored preferred name is "John Smith," the match score may be relatively high, indicating a strong similarity. However, if the legal name is "Jonathan Smith" and the stored preferred name is "J. Smith," the match score may decrease due to the reduced similarity.

In some embodiments, the match score service 804 may compare multiple attributes to compute the match score. For example, when both the user's legal name and date of birth are included in the comparison (e.g., according to a name and date of birth configuration), the match score service 804 may compute individual scores for each attribute and combine them to generate a composite match score. In this configuration, the match score service 804 may first compare the legal name to the preferred name stored in the resource server(s) 106, and then compare the date of birth from the user identity information with the date of birth stored in the resource server(s) 106. If both the legal name and the date of birth match, the composite match score may be significantly higher, indicating a greater confidence in the accuracy of the match. In cases where the name matches but the birth date shows slight discrepancies (e.g., a one-day difference), the match score service 804 may adjust the score accordingly, reflecting the partial mismatch in the comparison. Similarly, in cases where the birth date matches but the names have a slight variation (e.g., J. Smith vs. John Smith), the match score service 804 may adjust the score accordingly, but may still be relatively high.

In some embodiments, the match score service 804 is configured to compare biometric data, such as profile photos. In this configuration, the match score service 804 may retrieve a profile photo from the resource server(s) 106 and compare it to a facial image obtained from the client device 102 (e.g., from a biometric image and/or a facial image from an identification document). The match score service 804 may extract facial features, such as geometric landmarks or ratios, from both the stored profile photo and the captured image(s), and calculate a similarity score based on these features. If the facial features match closely, the match score will increase, indicating a higher likelihood that the two images represent the same individual. However, discrepancies between the images, such as changes in appearance or lighting conditions, may result in a lower match score. In some embodiments, the evidence capture service 802 (and/ or match score service 804) may be configured to process the images to normalize the comparison, accounting for factors like pose or lighting variation (e.g., normalizing based on environmental conditions).

In some embodiments, the match score service 804 may be configured to compute a composite or combined match score according to a weighting function. For example, the match score service 804 may be configured to apply weights to different attributes used in the comparison. For example, in a configuration where the legal name, birth date, and profile photo are all compared, the match score service 804 may assign different weights to each attribute based on system policies or security requirements. For example, in a low-assurance environment, the name comparison may be given more weight, while in a higher-assurance environment, the profile photo comparison may carry more significance. The match score service 804 may be configured to compute the composite/combined match score, as a weighted sum of the individual scores for each attribute. For instance, in one example, a name-only match between "Jonathan Smith" and "John Smith" may yield a match score of 75%, which is sufficient for authentication in a low-assurance scenario. In another example, a comparison of both the name and birth date may yield a combined score of 90%, reflecting a higher degree of confidence in the match. In a high-assurance scenario, the match score service 804 may perform a multi-factor comparison, including a profile photo, yielding a match score of 95% when all attributes align closely.

The match score service 804 may be configured to compare the match score(s) to one or more threshold criteria, to determine an authentication status (e.g., successful authentication status or unsuccessful authentication status) for the user corresponding to the client device 102. The threshold criterion may be configured/selected/defined based on the specific attributes being compared, such as the legal name, birth date, or profile photo. In some embodiments, the threshold criterion may be dynamically adjusted/configured/ set based on the security policies configured by an admin of the resource server 106, as described above. For instance, in a name configuration, match score service 804 may be configured to use a high threshold criterion for comparison against the match score (e.g., for low assurance environments), allowing for successful authentication with a relatively high match score even in cases where minor variations exist between the legal name and the preferred name (e.g., "Jonathan Smith" vs. "John Smith"). Additionally, for name and birth date configurations (or name+birthdate+profile photo configurations, or iterations thereof), the match score service 804 may be configured to use a higher threshold criteria to ensure greater accuracy in high-assurance environments.

The match score service 804 may be configured to adapt the threshold criterion based on the complexity of the comparison and the weighting of each attribute. For example, in a multi-factor configuration where the user's legal name, birth date, and profile photo are compared, the match score service 804 may apply different thresholds for each attribute, such that the name comparison may have a lower match score, while the profile photo comparison satisfy a higher match score. The match score service 804 may determine a final authentication status, based on whether the combined match score meets or exceeds the overall threshold for the corresponding policy. In some embodiments, the match score service 804 may support different threshold configurations for different authentication contexts. For example, a lower threshold may be acceptable for basic account recovery requests (e.g., sending a password reset or multifactor reset), whereas higher thresholds may be used for accessing more sensitive third-party resources hosted on the resource server(s) 106 or performing more secure account recovery requests (e.g., accessing a locked account).

In some embodiments, the account management service 114 may be configured to set a flag, status, or indicator in the authentication profile 116 for the user, indicating a binding of the authentication profile 116 with the resource 104. The account management service 114 may be configured to receive the authentication status from the match score service 804, to set the flag/status/indicator in the authentication profile 116. For example, where the match score service 804 determines that the authentication status indicates successful authentication of the user to the resource 104 hosted at the resource server, the account management service 114 may be configured to set a flag status in the authentication profile 116 indicating successful binding of the resource 104 with the authentication profile 116 (e.g., according to the match score). For subsequent requests to recover the user's account with the resource 104 (and/or other resources 104 corresponding to the resource server 106), the request service 128 may be configured to identify the authentication profile 116 and determine the flag status indicating binding of the authentication profile 116 with the resource 104. The evidence capture service 802 may be configured to request a biometric image of the user from the authentication service executing on the client device 102, and use that for comparing to the profile image(s) 122, for indicating whether authentication is successful. In this regard, for subsequent request may be processed in a streamlined manner, due to previous binding of the account with the resource 104 to the authentication profile 116.

The authentication server(s) 108 may include a signaling service 806. The signaling service 806 may be designed or configured to communicate, indicate, or otherwise transmit a signal to the server(s) 106 corresponding to the resource 104, to indicate the authentication status of the user for accessing the resource 104 according to the match score. The signaling service 806 may be configured to transmit the signal indicating successful (or unsuccessful) authentication statuses to the resource 104, such that the resource 104 can permit or deny access to the requested account recovery according to the authentication status. The signaling service 806 may be configured to transmit the signal responsive to initial requests (e.g., responsive to a SAML binding request, a recovery request for a MFA/Password/unlock recovery), and subsequent requests (e.g., after the account has been bound to the authentication profile 116).

Figure 11:
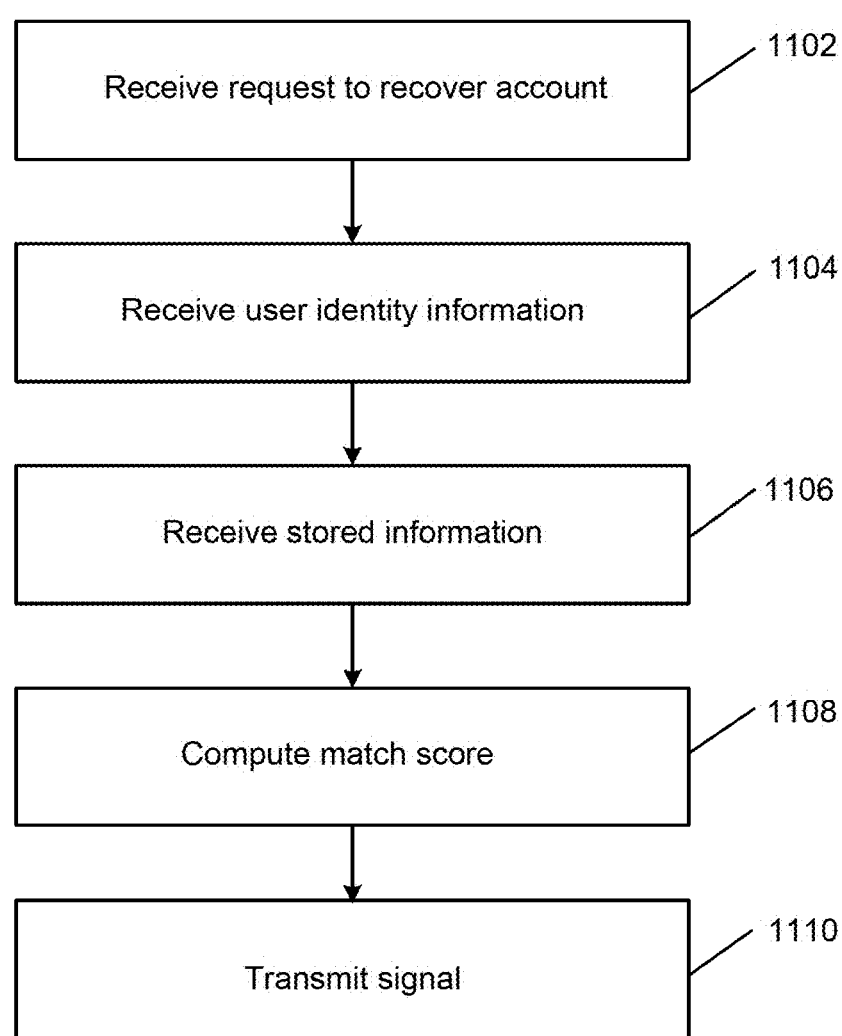
FIG. 11 is a flowchart showing an example method for authentication to resource servers, according to an example implementation of the present disclosure.

Referring now to FIG. 11, depicted is a flowchart showing an example method 1100 for authentication to resource servers, according to an example implementation of the present disclosure. The method 1100 may be performed, executed, or otherwise implemented by the components, elements, or hardware described above with reference to FIG. 1-FIG. 10. As a brief overview, at step 1102, the authentication server may receive a request to recover an account. At step 1104, the authentication server may receive user identity information. At step 1106, the authentication server may receive stored information. At step 1108, the authentication server may compute a match score. At step 1110, the authentication server may transmit a signal.

At step 1102, an authentication server 108 may receive a request to recover an account. In some embodiments, the request may be a request to recover an account with a third-party resource hosted on a second server (e.g., a resource 104 hosted on the resource server 106). The authentication server 108 may receive a request to authenticate the user to the third-party resource hosted on the second server, as part of an account recovery. This request may be initiated, for example, when a user attempts to access a protected resource or recover an account with a third-party resource or service. The authentication server 108 may process the request to authenticate the user based on user identity information that is collected during the session. The authentication server may receive the request from the client device 102 (e.g., which is attempting to access the resource), from the resource or the resource server, and/or from a different client device 102 bound to an authentication profile 116 of the user.

At step 1104, the authentication server 108 may receive user identity information. In some embodiments, the authentication server 108 may receive the user identity information from the client device 102 via a session between the authentication server 108 and an authentication service executing on the client device 102. The user identity information may include an image of an identification document (ID), such as a government-issued ID, that contains one or more attributes of the user (e.g., the user's legal name, a photograph of the user, a date of birth, a home address of the user, etc.).

In some embodiments, the user identity information may include a biometric image of the user, captured via one or more cameras of the client device 102 during the session. The authentication server 108 may compare one or more features extracted from the photograph on the identification document with one or more features extracted from the biometric image of the user. For example, the authentication server 108 may compare facial landmarks, ratios, and geometric patterns in both images to compute a match score reflecting the similarity between the two images of the user's face (e.g., from the identification document and the biometric image). A higher match score may indicate a stronger likelihood that the biometric image corresponds to the photograph on the ID, helping to verify the user's identity.

At step 1106, the authentication server 108 may retrieve or otherwise receive stored information relating to the user from the second server (e.g., resource server 106). The stored information may correspond to the user identity information provided by the client device 102, such as the user's legal name, profile image, date of birth, and/or other relevant user attributes. The stored information may be provided on-demand (e.g., responsive to a request from the authentication server sent to the second server via an exposed API and/or a directory integration), provided prior to receiving the request via a file import to the authentication server 108, and so forth. The authentication server 108 uses this stored information in combination with the user identity information obtained from the client device 102 to authenticate the user.

In some embodiments, the authentication server 108 may apply a first portion of the user identity information (e.g., legal name) to a model to determine a uniqueness score associated with the user identity information. The uniqueness score may reflect the probability that the user identity information (e.g., a legal name like "John Smith") corresponds to multiple individuals. The authentication server 108 compares the uniqueness score to a threshold criterion (e.g., a threshold uniqueness score). The authentication server 108 may select a type of stored information to receive/retrieve/use from the resource server 106, based on the uniqueness score as compared to the threshold. For example, in cases where the uniqueness score indicates that the legal name is common (e.g., "John Smith"), the authentication server 108 may retrieve and/or use additional stored information, such as the user's birth date and/or profile photo, to increase the assurance of the authentication process.

In some embodiments, stored information from the resource server 106 may include a user designation with respect to the third-party resource. For example, a user may have different roles or designations across different resources or within the enterprise (e.g., employee for one resource, administrator for another, member of a particular department, and so forth). Based on the user designation, the authentication server 108 may select different types of stored information to retrieve from the resource server 106 for comparison with the user identity information obtained from the client device 102, and according to one or more policies (e.g., policies for the particular designation, policies for the particular type of request, and so forth).

In implementations in which different third-party resources and/or different requests have different policies for selecting the stored information, the authentication server 108 may retrieve different sets of stored information according to the user designation and/or request type. For example, a user designation for a first third-party resource may involve a comparison of the user's legal name and profile image, while the user designation for a second third-party resource may involve a comparison of the legal name, birth date, and additional biometric data. The authentication server 108 select the corresponding stored information for use in the comparison, based on or according to the user designation and the corresponding third-party resource being accessed.

At step 1108, the authentication server 108 may compute a match score. In some embodiments, the authentication server 108 may compute a match score by comparing at least a portion of the stored information from the resource server 106 with at least a portion of the user identity information received from the client device 102. For example, the authentication server 108 may compute the match score based on a subset of the user identity information and corresponding attributes of the stored information from the resource server 106, according to the policies (e.g., for the user designation and/or the request type). The match score may be used to assess the similarity between the two sets of information for determining the likelihood that the user identity information from the client device 102 corresponds to the stored information in the resource server 106. For example, when comparing a legal name from the user's identification document with a preferred name stored in the resource server 106, the match score may be relatively high if the names are similar, such as "Jonathan Smith" and "John Smith." However, if the legal name is significantly different from the stored name, such as "Jonathan Smith" versus "Jonathon Smythe," the match score may decrease, reflecting the reduced likelihood of a match.

The match score may also vary depending on the amount of information used in the comparison. For instance, if both the legal name and date of birth are compared, the match score may increase when both attributes align closely. For example, a user named "Jonathan Smith" with a birth date of "Jan. 15, 1985" may have a higher match score if both the name and birth date match the stored information in the resource server 106. On the other hand, if only the birth dates match and the names have a slight different (e.g., "John Smith" versus "Jonathan Smith"), the match score may be slightly reduced to account for this minor discrepancy.

Similarly, when the authentication server 108 compares a biometric image (e.g., a selfie) captured by the client device 102 with a photograph stored in the resource server 106, the match score may be adjusted based on the similarity of facial features. If the facial landmarks in both the biometric image and the stored photograph closely match, such as the same eye positions and jawline structure, the match score may be high. However, if the biometric image shows significant differences from the stored photograph—such as the user wearing glasses or having facial hair in the live capture but not in the stored image—the match score may decrease slightly to reflect these changes.

In some embodiments, the match score may also be computed, based on the uniqueness score corresponding to the user's name. For instance, a user with a common name like "John Smith" may have a lower initial match score because there is a higher probability that multiple users share the same name. To account for this, the authentication server 108 may use additional attributes for the comparison, such as the user's birth date or profile photo, to increase the score and reduce the likelihood of a false match. Conversely, a user with a more unique name may receive a higher match score based on the name alone, as there is a lower probability of multiple individuals with the same name in the stored information.

In some embodiments, the authentication server 108 computes a match score based on a comparison of the legal name from the user identity information and the preferred name stored in the resource server 106. The match score may reflect the probability of a match between the legal name from the identification document and the preferred name stored in the resource server. For example, if the user identity information further includes a birth date, the authentication server 108 may compute a composite score reflecting the likelihood of a person with the legal name and birth date from the identification document matching a person with the preferred name and birth date stored in the second server.

In some embodiments, the authentication server 108 may compute a combined or composite match score, based on comparisons of individual attributes from the user identity information and the stored information. For example, the authentication server 108 may compute the composite match score based on weights applied to different attributes (e.g., higher weights on photograph or date of birth comparisons, lower weights on name matches, and so forth). The authentication server 108 may compare the composite match score to a threshold (e.g., administrator-configured threshold, resource-specific threshold, request type-threshold, and so forth), to determine whether the authentication is successful.

At step 1110, the authentication server 108 may transmit a signal to the resource server 106. In some embodiments, the authentication server 108 may transmit the signal to indicate the authentication status of the user for accessing the third-party resource. The authentication server 108 may determine the authentication status based on the computed match score as compared to a threshold criterion. The authentication status may indicate whether the user has successfully authenticated based on the comparison between the user identity information and the stored information. The authentication status may indicate successful binding of the user's authentication profile with the third-party resource if the match score satisfies a predefined match criterion.

The authentication server 108 may transmit the signal to indicate the authentication status based on the comparison between the biometric image and the photograph from the identification document, and according to the match score. In some embodiments, the stored information from the second server may include a profile image associated with the third-party resource, and the authentication server 108 may transmit the signal to indicate the authentication status based on the comparison of 1) the biometric image and the photograph meeting a first matching criterion (e.g., indicating successful correspondence between the user indicated in the ID and the user capturing a selfie/biometric image), and 2) the profile image and at least one of the biometric image or the photograph meeting a second matching criterion (e.g., indicating successful correspondence between the user matched to the ID/biometric image, and the user indicated in the profile image from the directory).

In some embodiments, responsive to the match score satisfying a threshold criterion, the authentication server 108 may set a flag status in the authentication profile 116 of the user with the authentication server 108. The flag status may indicate binding of the user's authentication profile 116 to the third-party resource. The flag status may indicate that the resource 104 was successfully bound to the authentication profile 116, thereby permitting subsequent requests to be processed without ID verification and analysis. For example, for subsequent authentication requests, the authentication server 108 may receive a second request to authenticate the user to the third-party resource hosted on the resource server 106. The authentication server 108 may determine the flag status in the user's authentication profile and retrieve a biometric image of the user from the client device 102. The authentication server 108 may then compare the biometric image with an image stored in association with the user's authentication profile, and transmit a second signal to the resource server 106 indicating successful authentication if the biometric image satisfies the match criteria.

4. Machine Learning and Artificial Intelligence Systems

Figure 12:
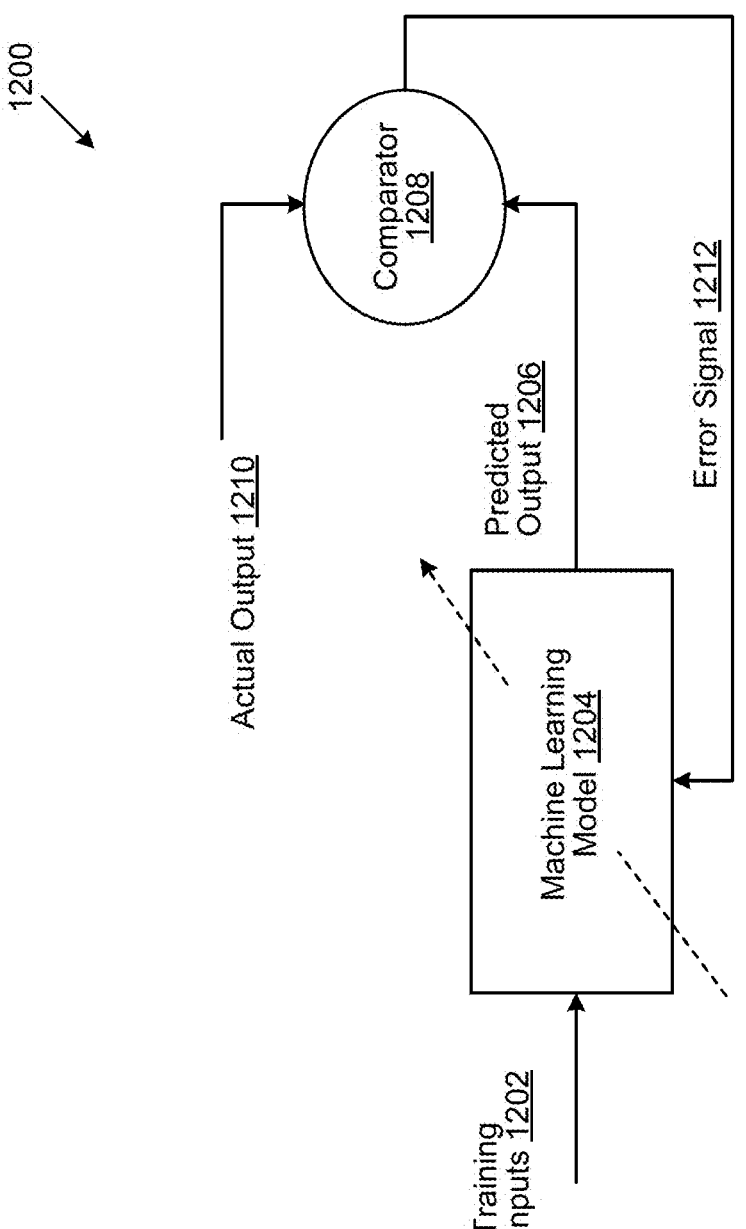
FIG. 12 is a block diagram of an example system using supervised learning, according to an example implementation of the present disclosure.

Referring to FIG. 12, a block diagram of an example system using supervised learning, is shown. The system shown in FIG. 12 may be used by or included as a component of the evidence validation service 132, the biometric validation service 134, the evidence capture service 802, the match score service 804, etc. Supervised learning is a method of training a machine learning model given input-output pairs. An input-output pair is an input with an associated known output (e.g., an expected output).

Machine learning model 1204 may be trained on known input-output pairs such that the machine learning model 1204 can learn how to predict known outputs given known inputs. Once the machine learning model 1204 has learned how to predict known input-output pairs, the machine learning model 1204 can operate on unknown inputs to predict an output.

The machine learning model 1204 may be trained based on general data and/or granular data (e.g., data based on a specific user/resource/authentication information/identity information) such that the machine learning model 1204 may be trained specific to a particular task/implementation.

Training inputs 1202 and actual outputs 1210 may be provided to the machine learning model 1204. Training inputs 1202 may include, for example, known fraudulent images or digitally manipulated images, fake identification documents (IDs) such as fake driver's licenses, legitimate IDs, and the like. Actual outputs 1210 may include, for example, flags or identifiers which indicate whether the images are legitimate or fraudulent. As another example, training inputs 1202 may include, for example, pairs of known user identity information and stored information, pairs of photos of the same or different users, and the like. Actual outputs 1210 may include, for example, flags or identifiers which indicate whether the identity information and stored information match, whether the photos are of the same or different persons, etc.

The inputs 1202 and actual outputs 1210 may be received from one or more data structures or data repositories, from government entity repositories, and so forth. For example, a data repository may contain images/information of matched and unmatched persons. The data repository may also contain data associated with flags or identifiers which indicate whether the evidence is matched or unmatched. Thus, the machine learning model 1204 may be trained to predict whether evidence provided by a user is fraudulent or legitimate, and whether the authentication information is matched or unmatched, based on the training inputs 1202 and actual outputs 1210 used to train the machine learning model 1204.

In some embodiments, a single machine leaning model 1204 may be trained to make one or predictions relating to the evidence provided by the user. In some embodiments, a plurality of machine learning models 1204 may be trained to make the one or more predictions. For example, a first machine learning model 1204 may be trained to predict whether the evidence was legitimately captured by the client device 102, a second machine learning model 1204 may be trained to predict whether the evidence has been digitally altered, a third machine learning model 1204 may predict whether the evidence matches stored information, and so forth. The comparator 1208 may compare the predicted outputs 1206 to actual outputs 1210 to determine an amount of error or differences.

During training, the error (represented by error signal 1212) determined by the comparator 1208 may be used to adjust the weights in the machine learning model 1204 such that the machine learning model 1204 changes (or learns) over time. The machine learning model 1204 may be trained using a backpropagation algorithm, for instance. The backpropagation algorithm operates by propagating the error signal 1212. The error signal 1212 may be calculated each iteration (e.g., each pair of training inputs 1202 and associated actual outputs 1210), batch and/or epoch, and propagated through the algorithmic weights in the machine learning model 1204 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 1204 may be tuned to reduce the amount of error, thereby minimizing the differences between (or otherwise converging) the predicted output 1206 and the actual output 1210. The machine learning model 1204 may be trained until the error determined at the comparator 1208 is within a certain threshold (or a threshold number of batches, epochs, or iterations have been reached). The trained machine learning model 1204 and associated weighting coefficients may subsequently be stored in memory 1216 or other data repository (e.g., a database) such that the machine learning model 1204 may be employed on unknown data (e.g., not training inputs 1202). Once trained and validated, the machine learning model 1204 may be employed during a testing (or an inference phase). During testing, the machine learning model 1204 may ingest unknown data to predict future data (e.g., legitimate vs. illegitimate evidence).

Figure 13:
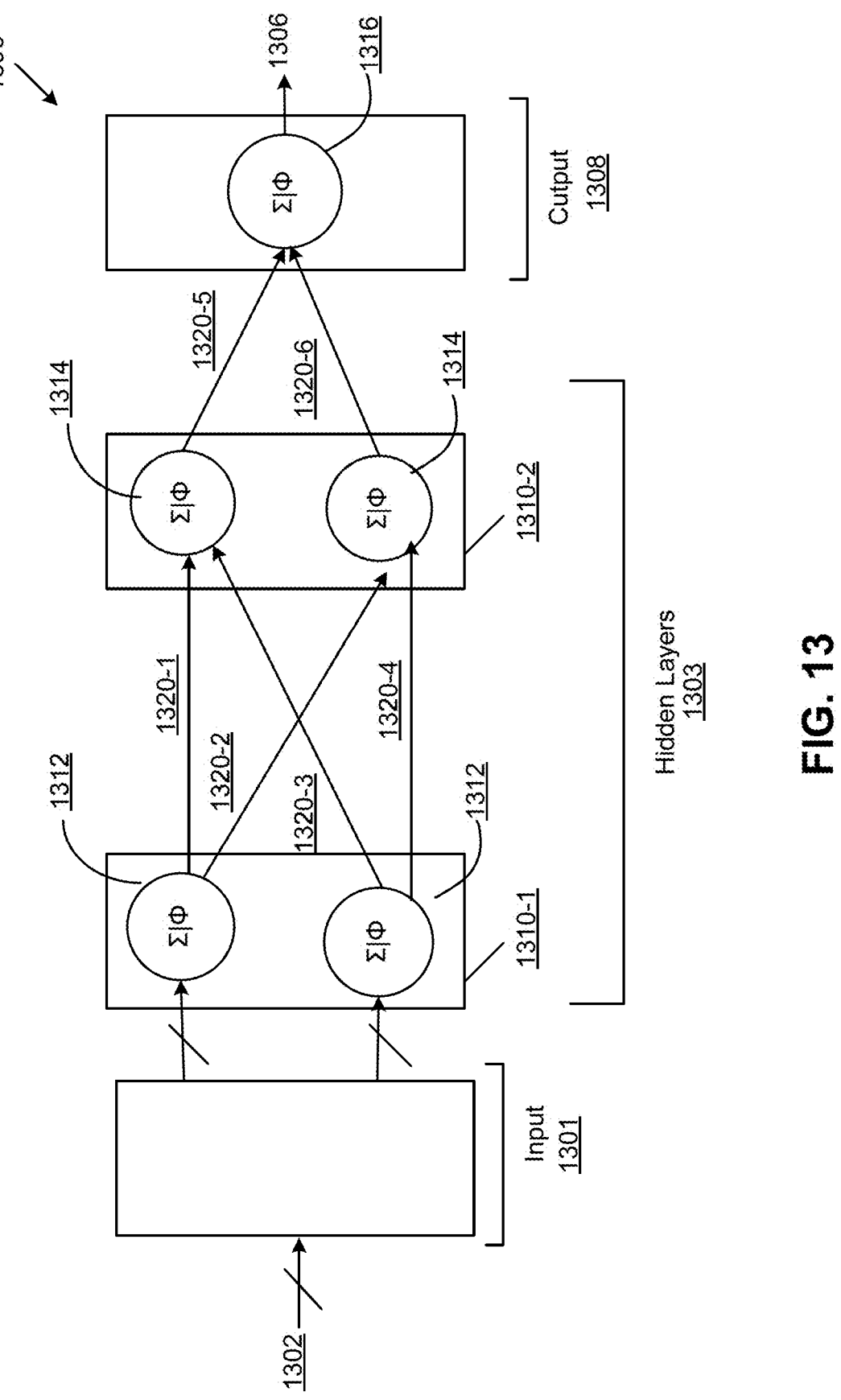
FIG. 13 is a block diagram of a simplified neural network model, according to an example implementation of the present disclosure.

Referring to FIG. 13, a block diagram of a simplified neural network model 1300 is shown. The neural network model 1300 may include a stack of distinct layers (vertically oriented) that transform a variable number of inputs 1302 being ingested by an input layer 1304, into an output 1306 at the output layer 1308.

The neural network model 1300 may include a number of hidden layers 1310 between the input layer 1304 and output layer 1308. Each hidden layer has a respective number of nodes (1112, 1314 and 1316). In the neural network model 1300, the first hidden layer 1310-1 has nodes 1312, and the second hidden layer 1310-2 has nodes 1314. The nodes 1312 and 1314 perform a particular computation and are interconnected to the nodes of adjacent layers (e.g., nodes 1312 in the first hidden layer 1310-1 are connected to nodes 1314 in a second hidden layer 1310-2, and nodes 1314 in the second hidden layer 1310-2 are connected to nodes 1316 in the output layer 1308). Each of the nodes (1112, 1314 and 1316) sum up the values from adjacent nodes and apply an activation function, allowing the neural network model 1300 to detect nonlinear patterns in the inputs 1302. Each of the nodes 1312, 1314 and 1316) are interconnected by weights 1320-1, 1320-2, 1320-3, 1320-4, 1320-5, 1320-6 (collectively referred to as weights 1320). Weights 1320 are tuned during training to adjust the strength of the node. The adjustment of the strength of the node facilitates the neural network's ability to predict an accurate output 1306.

In some embodiments, the output 1306 may be one or more numbers. For example, output 1306 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

5. Computer Architecture

Figure 14:
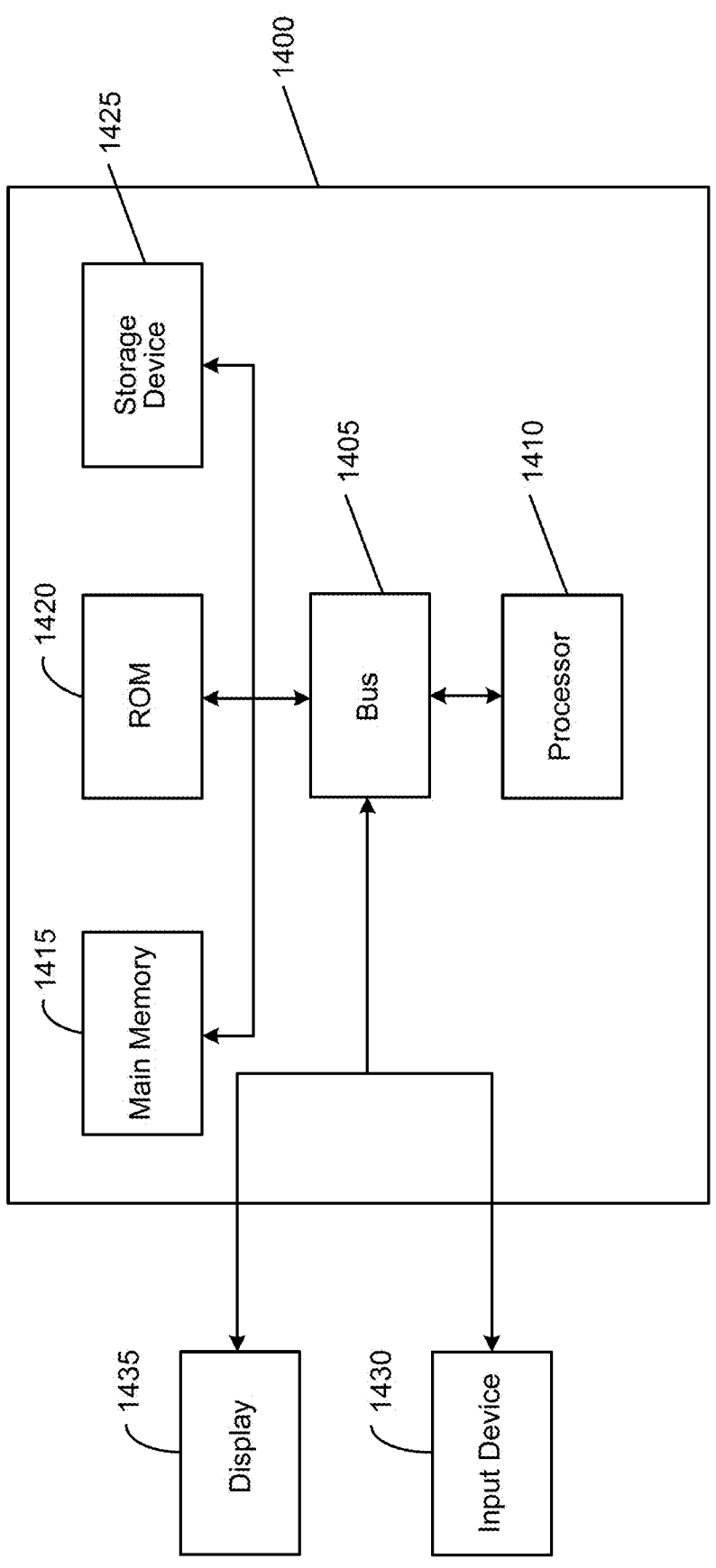
FIG. 14 is a block diagram of an example computer system, according to an example implementation of the present disclosure.

FIG. 14 depicts an example block diagram of an example computing system 1400. The computing system or computer device 1400 can include or be used to implement a data processing system or its components. The computing system 1400 includes at least one bus 1405 or other communication component for communicating information and at least one processor 1410 or processing circuit coupled to the bus 1405 for processing information. The computing system 1400 can also include one or more processors 1410 or processing circuits coupled to the bus for processing information. The computing system 1400 also includes at least one main memory 1415, such as a random access memory (RAM) or other dynamic storage device, coupled to the bus 1405 for storing information, and instructions to be executed by the processor 1410. The main memory 1415 can be used for storing information during execution of instructions by the processor 1410. The computing system 1400 may further include at least one read only memory (ROM) 1420 or other static storage device coupled to the bus 1405 for storing static information and instructions for the processor 1410. A storage device 1425, such as a solid state device, magnetic disk or optical disk, can be coupled to the bus 1405 to persistently store information and instructions.

The computing system 1400 may be coupled via the bus 1405 to a display 1435, such as a liquid crystal display, or active matrix display, for displaying information to a user. An input device 1430, such as a keyboard or voice interface may be coupled to the bus 1405 for communicating information and commands to the processor 1410. The input device 1430 can include a touch screen display 1435. The input device 1430 can also include a cursor control, such as a mouse, a trackball, or cursor direction keys, for communicating direction information and command selections to the processor 1410 and for controlling cursor movement on the display 1435.

The processes, systems and methods described herein can be implemented by the computing system 1400 in response to the processor 1410 executing an arrangement of instructions contained in main memory 1415. Such instructions can be read into main memory 1415 from another computer-readable medium, such as the storage device 1425. Execution of the arrangement of instructions contained in main memory 1415 causes the computing system 1400 to perform the illustrative processes described herein. One or more processors in a multi-processing arrangement may also be employed to execute the instructions contained in main memory 1415. Hard-wired circuitry can be used in place of or in combination with software instructions together with the systems and methods described herein. Systems and methods described herein are not limited to any specific combination of hardware circuitry and software.

Although an example computing system has been described in FIG. 14, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one imple- mentation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method comprising:

receiving, by an authentication server, a request to authenticate a user to a third-party resource hosted on a second server, the second server being maintained by a second entity which is separate from an entity associated with the authentication server;

receiving, by the authentication server from a client device of a user, via a session between the authentication server and an authentication service executing on the client device, an image of an identification document (ID) including user identity information for the user;

receive, by the authentication server, from the second server, stored information relating to the user, the stored information corresponding to the user identity information and the stored information included in a directory maintained by the second entity, the directory corresponding to an enterprise resource associated with the second entity, the directory being accessible to the authentication server responsive to establishing a connection with the directory of the second server;

computing, by the authentication server, a match score of at least a portion of the stored information from the second server and at least a portion of the user identity information; and transmitting, by the authentication server, a signal to the second server, the signal indicating an authentication status of the user for accessing the third-party resource, according to the match score.

2. The method of claim 1, further comprising, responsive to the match score satisfying a threshold criterion, setting a flag status indicating a binding of an authentication profile of the user with the authentication service to the third-party resource.

3. The method of claim 2, wherein the request comprises a first request, the method further comprising:

receiving, by the authentication server, a second request to authenticate the user to the third-party resource hosted on the second server;

determining, by the authentication server, the flag status in the authentication profile;

receiving, by the authentication server, a biometric image of the user from the authentication service executing on the client device; and transmitting, by the authentication server, a second signal to the second server indicating successful authentication of the user, responsive to a comparison of the biometric image of the user satisfying a match criteria with respect to an image stored in association with the authentication profile of the user.

4. The method of claim 1, further comprising:

applying, by the authentication server, a first portion of the user identity information to a model, to determine a uniqueness score associated with the first portion of the user identity information;

comparing, by the authentication server, the uniqueness score to a threshold; and selecting, by the authentication server, a type of the stored information from the second server based on the uniqueness score as compared to the threshold.

5. The method of claim 1, wherein the user identity information comprises a photograph of the user, the method further comprising:

receiving, by the authentication server, from the authentication service, a biometric image of the user captured via one or more cameras of the client device during the session; and comparing, by the authentication server, one or more features extracted from the photograph of the user to one or more features extracted from the biometric image.

6. The method of claim 5, wherein authentication server transmits the signal to indicate the authentication status based on the comparison and according to the match score.

7. The method of claim 5, wherein the portion of information from the second server comprises a profile image associated with the third-party resource, and wherein the authentication server transmits the signal to indicate the authentication status, responsive to 1) the biometric image and the photograph satisfying a first match criteria, and 2) the profile image and at least one of the biometric image or the photograph satisfying a second match criteria.

8. The method of claim 1, wherein the portion of the user identity information comprises a legal name, and wherein the portion of the stored information comprises a preferred name, and wherein the match score indicates a probability of a match between the legal name and the preferred name.

9. The method of claim 8, wherein the portion of the user identity information further comprises a date of birth as indicated in the identification document, and wherein the portion of the stored information further comprises a date of birth stored in the second server, and wherein the match score indicates the probability of a match between a person with the legal name having the date of birth as indicated in the identification document, and a person with the preferred name having the date of birth stored in the second server.

10. The method of claim 1, wherein the stored information further comprises a user designation with respect to the third-party resource, the method further comprising:

selecting, by the authentication server, a type of the stored information from the second server based on the user designation, for comparison with the portion of user identify information from the identification document.

11. The method of claim 10, wherein the third-party resource comprises a first third-party resource, wherein the stored information includes a first user designation for the first third-party resource and a second user designation for a second third-party resource, and wherein the authentication server selects different types of the stored information from the second server based on the user designation and the corresponding third-party resource.

12. The method of claim 1, wherein the authentication status indicates successful binding of an authentication profile of the user with the authentication service to the third-party resource, based on the match score satisfying a match criterion.

13. An authentication system comprising:

One or more authentication servers configured to:

receive a request to authenticate a user to a third-party resource hosted on a second server, the second server being maintained by a second entity which is separate from an entity associated with the one or more authentication servers;

receive, from a client device of a user, via a session between the authentication server and an authentication service executing on the client device, an image of an identification document (ID) including user identity information for the user;

receive, from the second server, stored information relating to the user, the stored information corresponding to the user identity information and the stored information included in a directory maintained by the second entity, the directory corresponding to an enterprise resource associated with the second entity, the directory being accessible to the authentication server responsive to establishing a connection with the directory of the second server;

compute a match score of at least a portion of the stored information from the second server and at least a portion of the user identity information; and transmit a signal to the second server, the signal indicating an authentication status of the user for accessing the third-party resource, according to the match score.

14. The authentication system of claim 13, wherein the one or more authentication servers are further configured to set, responsive to the match score satisfying a threshold criterion, a flag status indicating a binding of an authentication profile of the user with the authentication service to the third-party resource.

15. The authentication system of claim 13, wherein the one or more authentication servers are further configured to:

apply a first portion of the user identity information to a model, to determine a uniqueness score associated with the first portion of the user identity information;

compare the uniqueness score to a threshold; and select a type of the stored information to retrieve from the second server based on the uniqueness score as compared to the threshold.

16. The authentication system of claim 13, wherein the user identity information comprises a photograph of the user, and wherein the one or more authentication servers are further configured to:

receive, from the authentication service, a biometric image of the user captured via one or more cameras of the client device during the session; and compare one or more features extracted from the photograph of the user to one or more features extracted from the biometric image, wherein the one or more authentication servers transmit the signal to indicate the authentication status based on the comparison and according to the match score.

17. The authentication system of claim 16, wherein the portion of information from the second server comprises a profile image associated with the third-party resource, and wherein the one or more authentication servers transmit the signal to indicate the authentication status, responsive to 1) the biometric image and the photograph satisfying a first match criteria, and 2) the profile image and at least one of the biometric image or the photograph satisfying a second match criteria.

18. The authentication system of claim 13, wherein the stored information further comprises a user designation with respect to the third-party resource, and wherein the one or more authentication servers are further configured to:

select a type of the stored information from the second server based on the user designation, for comparison with the portion of user identify information from the identification document.

19. The authentication system of claim 18, wherein the third-party resource comprises a first third-party resource, wherein the stored information includes a first user designation for the first third-party resource and a second user designation for a second third-party resource, and wherein the one or more authentication servers select different types of the stored information from the second server based on the user designation and the corresponding third-party resource.

20. The authentication system of claim 13, wherein the authentication status indicates successful binding of an authentication profile of the user with the authentication service to the third-party resource, based on the match score satisfying a match criterion.

* * * * *